US011388019B2

(12) United States Patent
Tsuchiya et al.

(10) Patent No.: US 11,388,019 B2
(45) Date of Patent: Jul. 12, 2022

(54) FUNCTION MANAGEMENT APPARATUS, FUNCTION MANAGEMENT METHOD AND COMMUNICATION SYSTEM

(71) Applicant: Nippon Telegraph and Telephone Corporation, Tokyo (JP)

(72) Inventors: Hideo Tsuchiya, Tokyo (JP); Hideaki Iwata, Tokyo (JP); Akihiro Okada, Tokyo (JP); Shunsuke Homma, Tokyo (JP); Akihiro Kimura, Tokyo (JP); Katsuma Miyamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/970,217

(22) PCT Filed: Feb. 14, 2019

(86) PCT No.: PCT/JP2019/005297
§ 371 (c)(1),
(2) Date: Aug. 14, 2020

(87) PCT Pub. No.: WO2019/160021
PCT Pub. Date: Aug. 22, 2019

(65) Prior Publication Data
US 2021/0119822 A1    Apr. 22, 2021

(30) Foreign Application Priority Data

Feb. 16, 2018  (JP) .............................. JP2018-026323

(51) Int. Cl.
H04L 12/28    (2006.01)
G06F 9/455    (2018.01)
(Continued)

(52) U.S. Cl.
CPC ...... *H04L 12/2803* (2013.01); *G06F 9/45558* (2013.01); *H04L 47/82* (2013.01);
(Continued)

(58) Field of Classification Search
CPC .. H04L 12/2803; H04L 47/82; G06F 9/45558
See application file for complete search history.

(56) References Cited

U.S. PATENT DOCUMENTS

2013/0212578 A1* 8/2013 Garg .................. H04L 41/0668
718/1
2017/0078216 A1* 3/2017 Adolph ............... G06F 9/45558
(Continued)

OTHER PUBLICATIONS

Jpn.nec.com, [online], "Virtualized Customer Premises Equipment vCPE," 2017, retrieved on Dec. 22, 2017, retrieved from URL<http://jpn.nec.com/tcs/vcpe/index.html>, 7 pages (with English Translation).

(Continued)

*Primary Examiner* — William G Trost, IV
*Assistant Examiner* — Christopher P Cadorna
(74) *Attorney, Agent, or Firm* — Fish & Richardson P.C.

(57) ABSTRACT

A function management device that manages, in a communication system including a plurality of pieces of customer premises communication equipment and a server capable of providing a function to the plurality of pieces of customer premises communication equipment, the function provided by the server, and includes a resource management unit configured to collect resource information from the plurality of pieces of customer premises communication equipment, a network management unit configured to collect, from the server, network band information of each of the functions, the network band being between the plurality of pieces of customer premises communication equipment and the server, and a function processing unit configured to activate a virtual machine on one of the plurality of pieces of (Continued)

customer premises communication equipment on the basis of the resource information and the network band information to cause a first function selected on the basis of a band occupancy ratio from among the functions provided by the server to be executed.

11 Claims, 20 Drawing Sheets

(51) Int. Cl.
    *H04L 47/70*     (2022.01)
    *H04L 47/74*     (2022.01)
    *H04L 47/78*     (2022.01)
    *H04L 47/76*     (2022.01)
    *G06F 9/50*     (2006.01)

(52) U.S. Cl.
    CPC .. *G06F 9/5061* (2013.01); *G06F 2009/45595* (2013.01); *H04L 47/74* (2013.01); *H04L 47/76* (2013.01); *H04L 47/781* (2013.01); *H04L 47/782* (2013.01); *H04L 47/822* (2013.01)

(56) References Cited

U.S. PATENT DOCUMENTS

2018/0165110 A1\*   6/2018   Htay .......................... G06F 8/65
2019/0034363 A1\*   1/2019   Palermo .............. G06F 13/4068

OTHER PUBLICATIONS

Juniper.net, [online], "Virtualized CPE-Juniper Networks, Enterprise Managed Services Offerings," available no later than Feb. 16, 2018, retrieved on Dec. 22, 2017, 7 pages (with English Translation).

\* cited by examiner

FUNCTION MANAGEMENT APPARATUS, FUNCTION MANAGEMENT METHOD AND COMMUNICATION SYSTEM

CROSS-REFERENCE TO RELATED APPLICATIONS

This application is a National Stage application under 35 U.S.C. § 371 of International Application No. PCT/JP2019/005297, having an International Filing Date of Feb. 14, 2019, which claims priority to Japanese Application Serial No. 2018-026323, filed on Feb. 16, 2018. The disclosure of the prior application is considered part of the disclosure of this application, and is incorporated in its entirety into this application.

TECHNICAL FIELD

The present invention relates to a function management device, a function management method, and a communication system.

BACKGROUND ART

Virtual customer premises equipment (CPE) which aggregates functions of CPE deployed in a customer's home in a virtualized server has been considered. Introduction of this virtual CPE in a server on a network (NW) side as part of a carrier network along with an access switch or an edge router of a carrier has been considered (see NPL 1 and NPL 2).

FIG. 1 is a diagram showing the concept of virtual CPE. With respect to the virtual CPE, functions of a higher layer such as the Dynamic Host Configuration Protocol (DHCP), Network Address and Port Translation (NAPT), and Firewall (FW) may be transferred to a network-side server (hereinafter referred to as a virtual CPE server) from the CPE, and these functions are implemented as applications on the virtual CPE server. In addition, virtualization techniques can also be used at the virtual CPE server to add a functional application needed for providing services in the virtualized environment, enabling rapid and flexible addition of functions and achieving a cost reduction. It is only required that minimal functions such as a network connectivity function may be implemented in CPE by using virtual CPE, and as a result, a universal product such as a white box switch or a single board computer can be used as CPE.

CITATION LIST

Non Patent Literature

NPL 1: NEC, vCPE virtualized Customer Premises Equipment, Internet, URL <http://jpn.nec.com/tcs/vcpe/index.html>, accessed Jan. 22, 2018

NPL 2: JUNIPER, Virtualized CPE—Juniper Networks, Internet, URL <https://www.juniper.net/jp/jp/solutions/nfv/vcpe/>, accessed Jan. 22, 2018

SUMMARY OF THE INVENTION

Technical Problem

If virtual CPE is used, the CPE needs to give a request to a virtual CPE server for processing of functions that are not implemented by the CPE, such as DHCP, NAPT, or FW. However, if the CPE gives a request to the virtual CPE server for mass processing or requests simultaneous processing, a network band between the CPE and the virtual CPE server is likely to be under pressure.

FIG. 2 is a diagram (part 1) showing a problem occurring when virtual CPE is used. With respect to the CPE of the related art that does not use virtual CPE, unauthorized communication to a center base is blocked by the FW function and filtering function of the CPE as shown in (A) of FIG. 2. However, in a case in which a virtual CPE server provides the FW function and filtering function, all communication from user terminals is transmitted to the center base as shown in (B) of FIG. 2. For example, in a case in which a user terminal performs mass transmission caused by virus infection, the network bands are likely to be under pressure and Internet communication is not likely to be possible in the virtual CPE configuration of (B) of FIG. 2.

FIG. 3 is a diagram (part 2) showing a problem occurring when virtual CPE is used. In CPE of the related art that does not use virtual CPE, even if user terminals make simultaneous calls due to a power failure or the like as shown in (A) of FIG. 3, processing is performed on the CPE side, and thus the network bands are not under pressure. However, in a case in which the virtual CPE server provides the functions, all communication from the user terminals is transmitted to the center base as shown in (B) of FIG. 3. For example, in the case in which the user terminals make simultaneous calls due to a power failure or the like, network bands are likely to be under pressure and Internet communication is not likely to be possible in the virtual CPE configuration of (B) of FIG. 3.

The present invention aims to reduce or avoid pressure on a network band between CPE and a virtual CPE server caused by mass transmission or simultaneous calls from user terminals in a virtual CPE configuration.

Means for Solving the Problem

A function management device according to an embodiment of the present invention manages, in a communication system including a plurality of pieces of customer premises communication equipment and a server capable of providing a function to the plurality of pieces of customer premises communication equipment, the function provided by the server, and includes, a resource management unit configured to collect resource information from the plurality of pieces of customer premises communication equipment, a network management unit configured to collect, from the server, network band information of each of the functions, the network band being between the plurality of pieces of customer premises communication equipment and the server, and a function processing unit configured to activate a virtual machine on one of the plurality of pieces of customer premises communication equipment on the basis of the resource information and the network band information and to cause a first function to be executed, first function being selected on the basis of a band occupancy ratio from among the functions provided by the server.

A function management method according to an embodiment of the present invention manages, in a communication system including a plurality of pieces of customer premises communication equipment and a server capable of providing a function to the plurality of pieces of customer premises communication equipment, the function provided by the server, and includes, collecting resource information from the plurality of pieces of customer premises communication equipment, collecting, from the server, network band information of each of the functions, the network band being between the plurality of pieces of customer premises communication equipment and the server, and activating a virtual machine on one of the plurality of pieces of customer premises communication equipment on the basis of the resource information and the network band information to cause a first function to be executed, the first function being selected on the basis of a band occupancy ratio from among the functions provided by the server.

In addition, a communication system according to an embodiment of the present invention is a communication system including a plurality of pieces of customer premises communication equipment, a server capable of providing a function to the plurality of pieces of customer premises communication equipment, and a function management device that manages the function provided by the server, in which each of the plurality of pieces of customer premises communication equipment includes a resource management unit configured to manage resource information indicating a resource status inside the customer premises communication equipment, the server includes a network band management unit configured to manage network band information indicating a network band usage status of each of the functions, the network band being between the plurality of pieces of customer premises communication equipment and the server, and the function management device includes a resource management unit configured to collect the resource information from the plurality of pieces of customer premises communication equipment, a network management unit configured to collect the network band information from the server, and a function processing unit configured to activate a virtual machine on one of the plurality of pieces of customer premises communication equipment on the basis of the resource information and the network band information to cause a first function to be executed, the first function being selected on the basis of a band occupancy ratio from among the functions provided by the server.

Effects of the Invention

According to the present invention, in a virtual CPE configuration, it is possible to reduce or avoid pressure on a network band between CPE and a virtual CPE server caused by mass transmission and simultaneous calls from user terminals.

DESCRIPTION OF EMBODIMENTS

Embodiments of the present invention will be described below with reference to the drawings.

Figure 1:
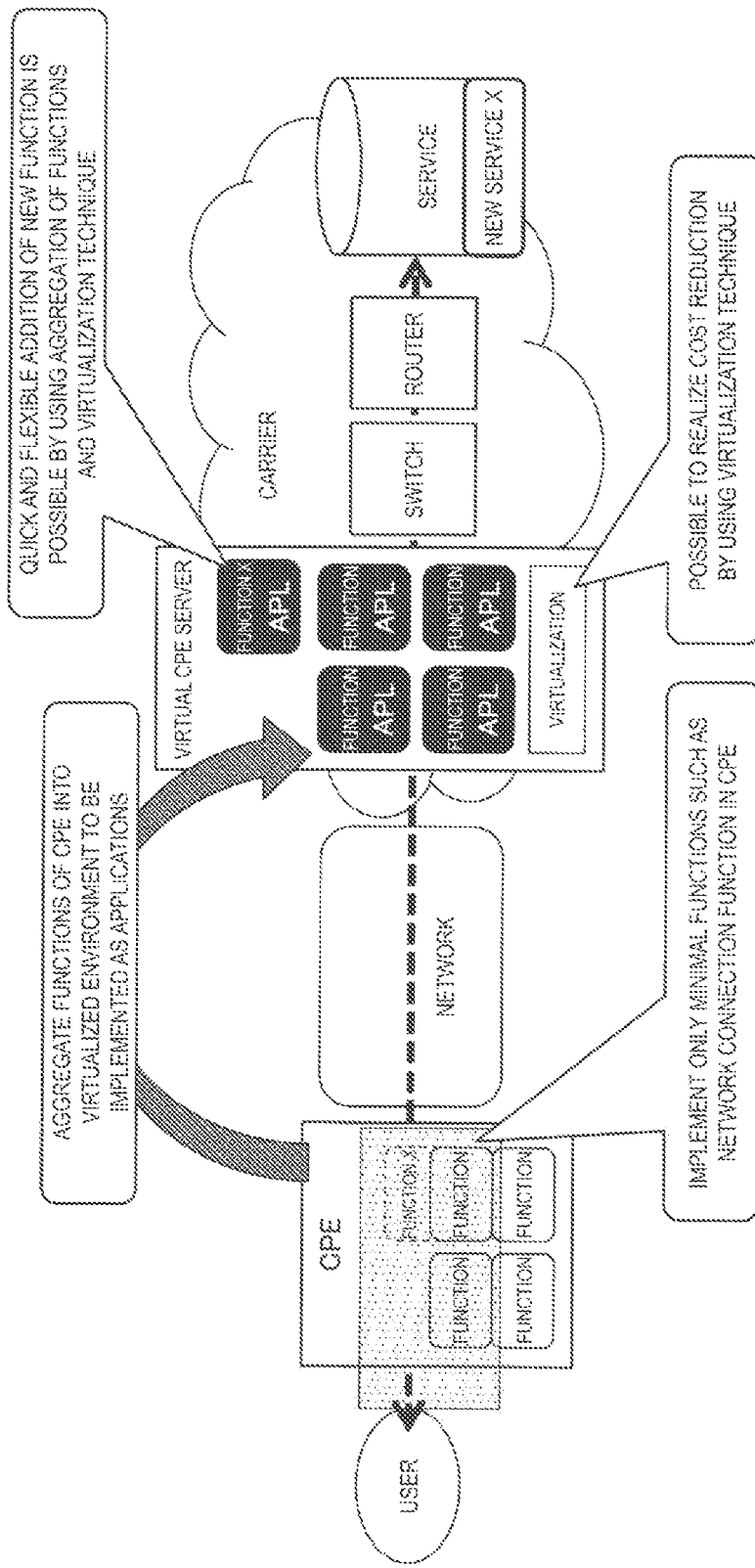
FIG. 1 is a diagram showing the concept of virtual CPE.
Figure 2:
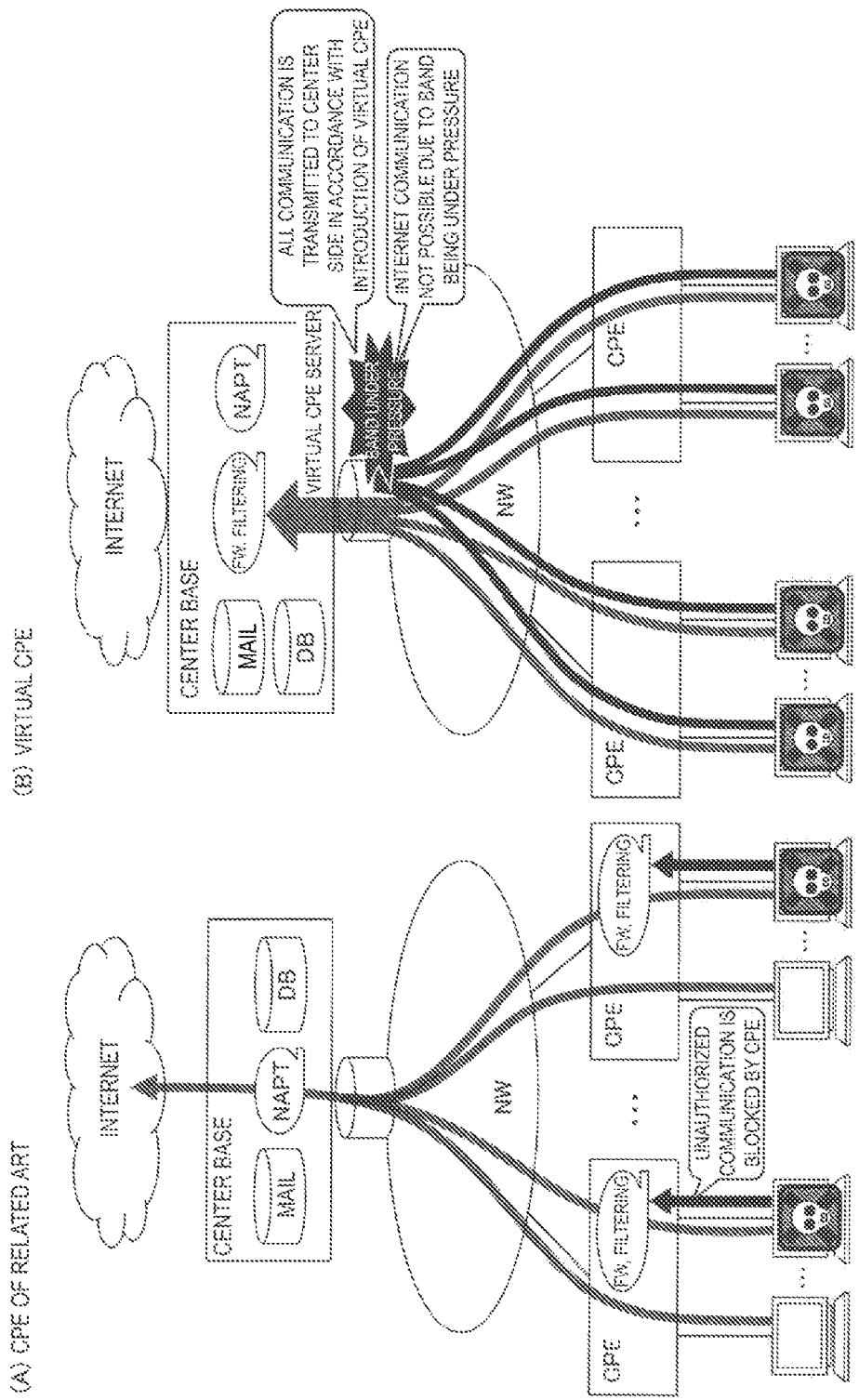
FIG. 2 is a diagram (part 1) showing a problem occurring when virtual CPE is used.
Figure 3:
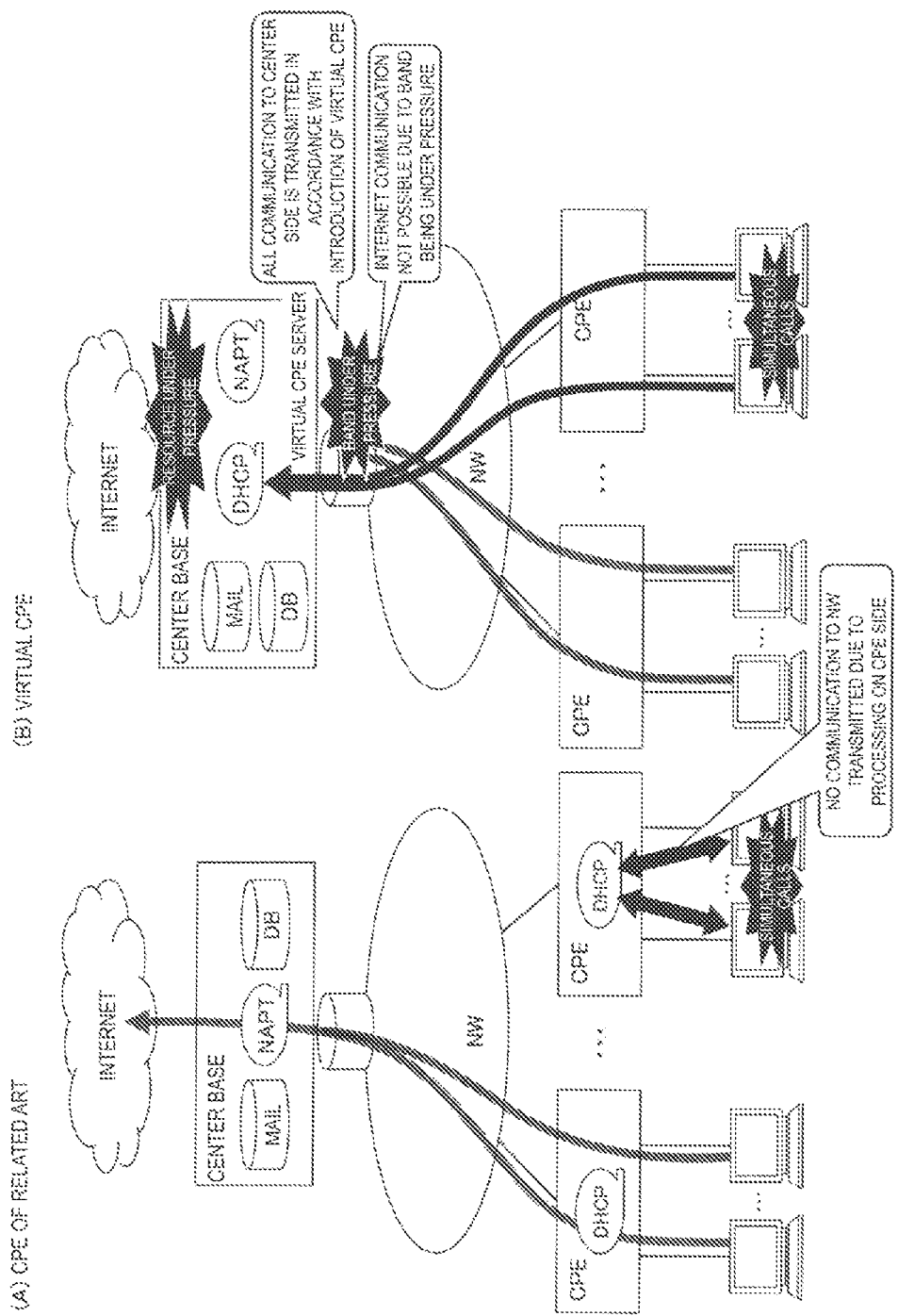
FIG. 3 is a diagram (part 2) showing a problem occurring when virtual CPE is used.
Figure 4:
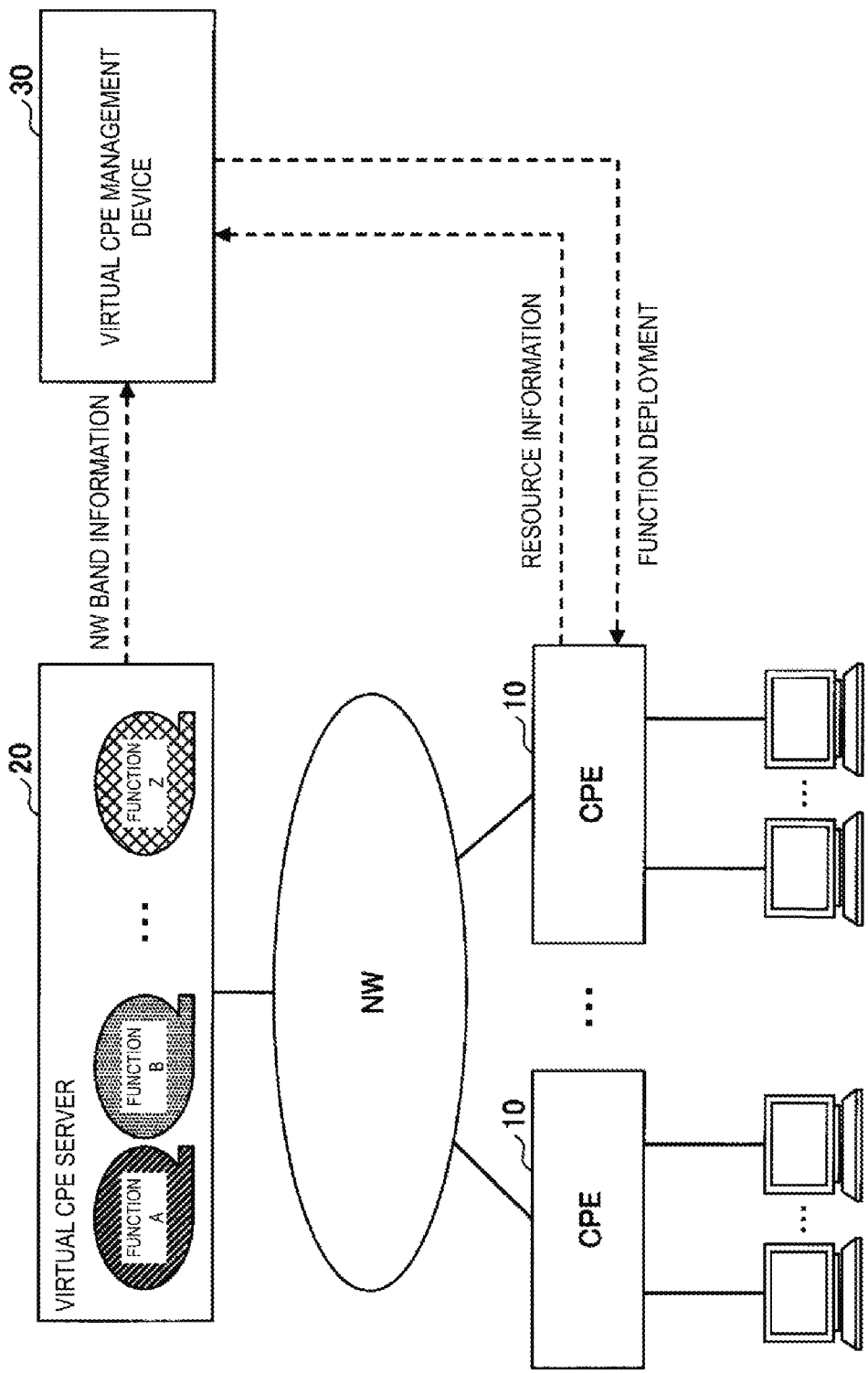
FIG. 4 is a schematic diagram of a communication system according to an embodiment of the present invention.

Overall Configuration of Communication System and Function Management Method FIG. 4 is a schematic diagram of a communication system according to an embodiment of the present invention. The communication system according to the embodiment of the present invention includes a plurality of pieces of CPE 10, a virtual CPE server 20 capable of providing functions such as DHCP, NAPT, FW, etc. for the CPE 10, and a virtual CPE management device 30 that manages the functions provided by the virtual CPE server 20. Note that the virtual CPE management device 30 can manage the functions of a plurality of virtual CPE servers 20.

The CPE 10 manages resource information indicating a status of a resource included in the CPE 10. For example, the CPE 10 monitors and manages free resources of a CPU, a memory, and the like included in the CPE 10. In addition, the CPE 10 executes the functions provided by the virtual CPE server 20 on the CPE 10 in accordance with an instruction of function deployment from the virtual CPE management device 30 described below.

The virtual CPE server 20 manages network band information indicating a network band usage status of each of the functions between the CPE 10 and the virtual CPE server 20. For example, the virtual CPE server 20 monitors and manages a network band usage status for each of the functions provided by the virtual CPE server 20, such as DHCP NAPT, FW, and the like.

The virtual CPE management device 30 collects resource information from the CPE 10, collects network band information from the virtual CPE server 20, activates a virtual machine on any CPE 10 on the basis of the resource information and the network band information, and causes a function with a high band occupancy ratio from among the functions provided by the virtual CPE server 20 to be executed. For example, the virtual CPE management device 30 detects a function with a high band occupancy ratio from the network band information. The function with a high band occupancy ratio may be detected by comparing the ratio to a threshold or may be selected in descending order of band occupancy ratios. In addition, the virtual CPE management device 30 determines, from the resource information, whether the function with a high band occupancy ratio is executable in the CPE 10, and if the function is executable, the virtual CPE management device 30 activates the virtual machine on the CPE 10 and gives an instruction of function deployment to perform the function with a high band occupancy ratio.

Referring to FIG. 5 to FIG. 9, the configurations and process of the CPE 10, the virtual CPE server 20, and the virtual CPE management device 30 will be further described.

Figure 5:
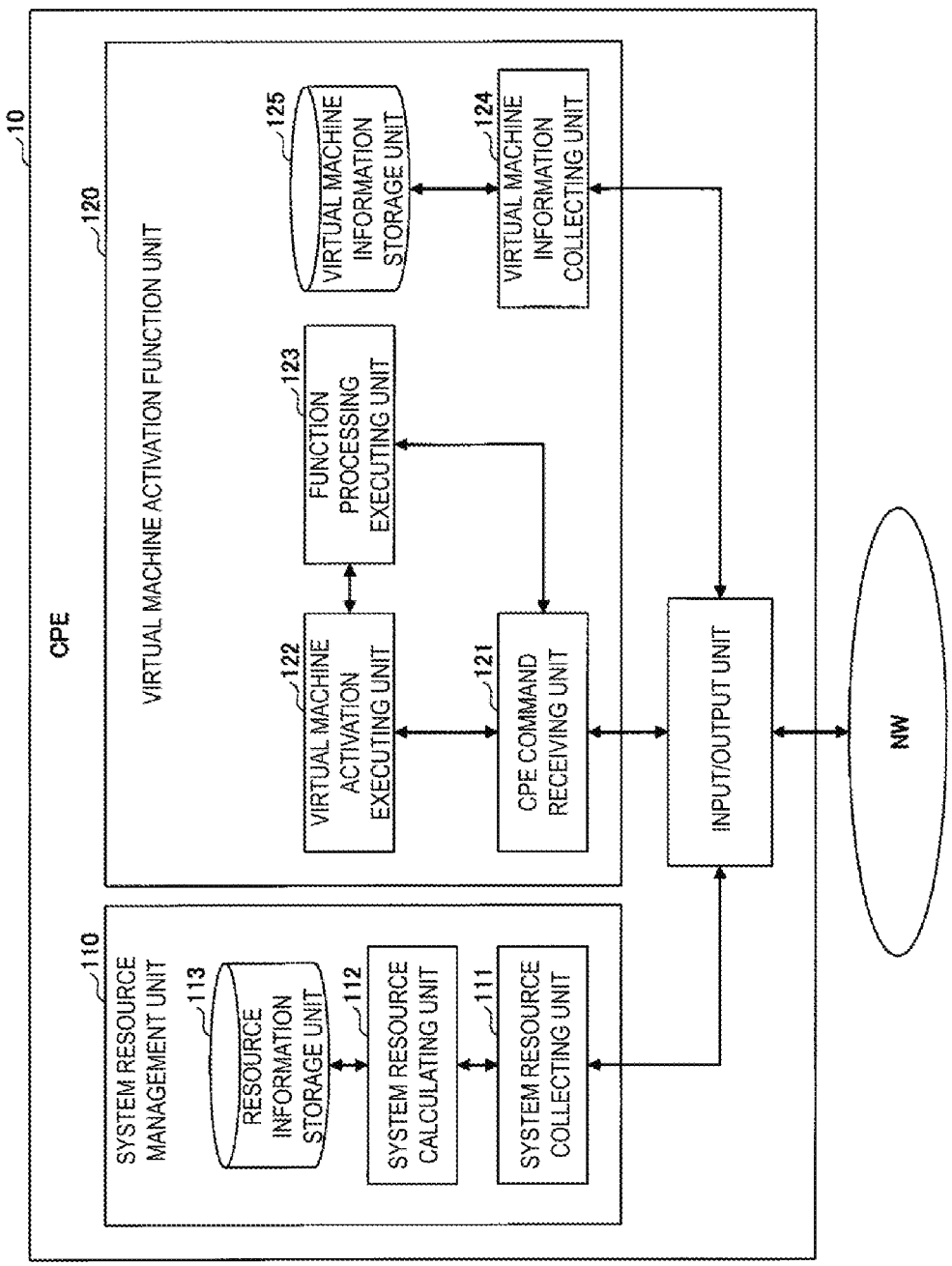
FIG. 5 is a functional configuration diagram of CPE according to an embodiment of the present invention.

FIG. 5 is a functional configuration diagram of the CPE 10 according to an embodiment of the present invention. The CPE 10 includes a system resource management unit 110, a virtual machine activation function unit 120, and an input/output unit.

The system resource management unit 110 includes a system resource collecting unit 111 that collects resource statuses inside the CPE 10, a system resource calculating unit 112 that calculates free resources, and a resource information storage unit 113 that stores information of the resources. Note that free resources may be calculated by a CPE resource calculating unit 312 of the virtual CPE management device 30, which will be described below.

The virtual machine activation function unit 120 includes a CPE command receiving unit 121 that receives an instruction of function deployment (or cancellation of the function deployment) to perform a function with a high band occupancy ratio on the CPE 10 from the virtual CPE management device 30, a virtual machine activation executing unit 122 that activates a virtual machine (or cancels the activation of the virtual machine) on the CPE 10, and a function processing executing unit 123 that executes a function instructed by the virtual CPE management device 30 on the virtual machine (or cancels the execution of the function). In addition, the virtual machine activation function unit 120 includes a virtual machine information collecting unit 124 that collects an amount of traffic to be processed by a function executed on the virtual machine of the CPE 10, and a virtual machine information storage unit 125 that stores information of the virtual machine.

Figure 6:
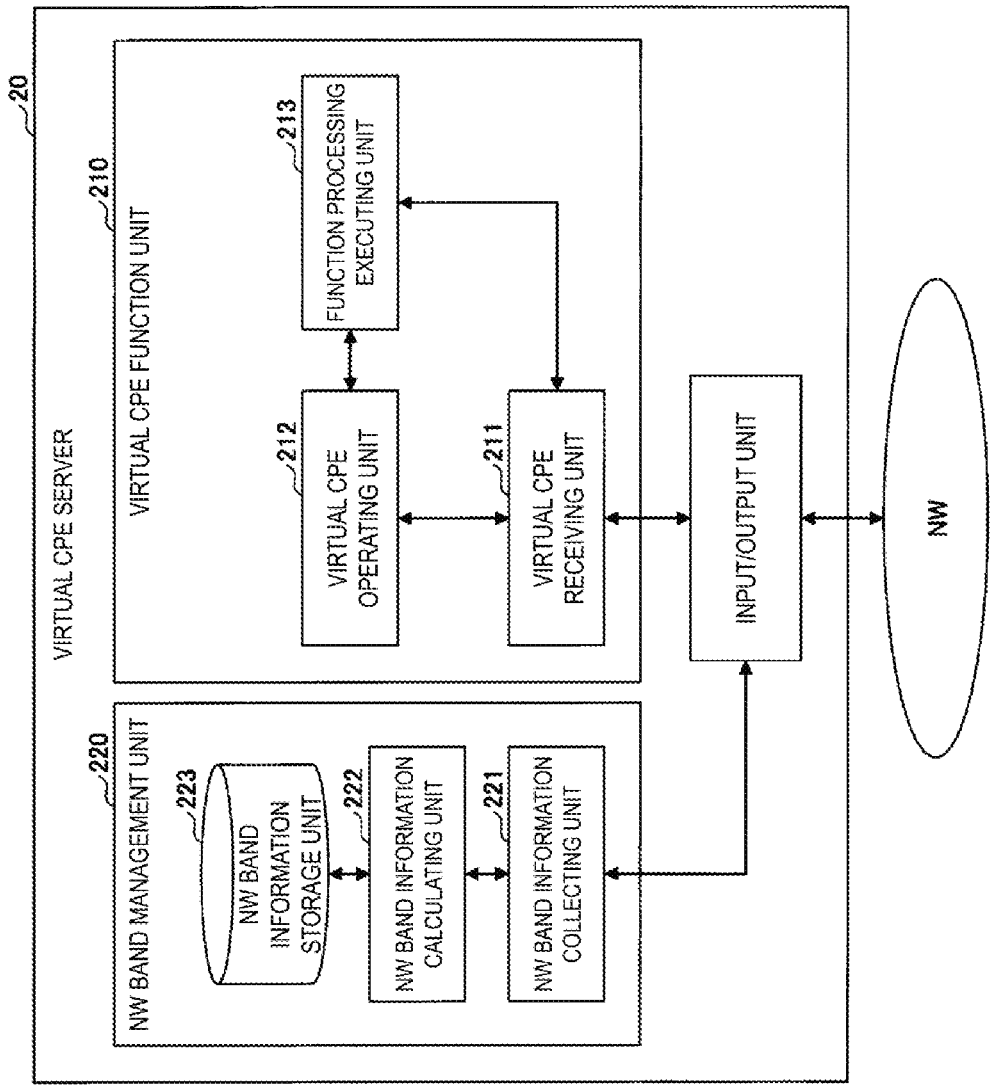
FIG. 6 is a functional configuration diagram of a virtual CPE server according to an embodiment of the present invention.

FIG. 6 is a functional configuration diagram of the virtual CPE server 20 according to an embodiment of the present invention. The virtual CPE server 20 includes a virtual CPE function unit 210, an NW band management unit 220, and an input/output unit.

The virtual CPE function unit 210 includes a virtual CPE transmitting/receiving unit 211 that receives, from the virtual CPE management device 30, an instruction of function deployment (or cancellation of the function deployment) to execute the function to be provided to the CPE 10 on the virtual CPE server 20, a virtual CPE operating unit 212 that realizes a virtualized environment for performing the function deployment instructed by the virtual CPE management device 30, and a function processing executing unit 213 that executes processing of the function (or cancels the execution of the function) to be provided to the CPE 10 in accordance with an instruction of the virtual CPE management device 30.

The NW band management unit 220 includes an NW band information collecting unit 221 that collects a network usage status between the CPE 10 and the virtual CPE server 20, an NW band information calculating unit 222 that calculates a total band used between the CPE 10 and the virtual CPE server 20 and a band occupancy ratio of each function, and an NW band information storage unit 223 that stores information of the NW band. As will be described below, if specific CPE 10 exhibits a high band occupancy ratio and the virtual CPE management device 30 gives the specific CPE 10 an instruction of function deployment, the NW band information calculating unit 222 calculates a band occupancy ratio by CPE and by function. Note that the total band used and the band occupancy ratio may be calculated by an NW band calculating unit 322 of the virtual CPE management device 30, which will be described below.

Figure 7:
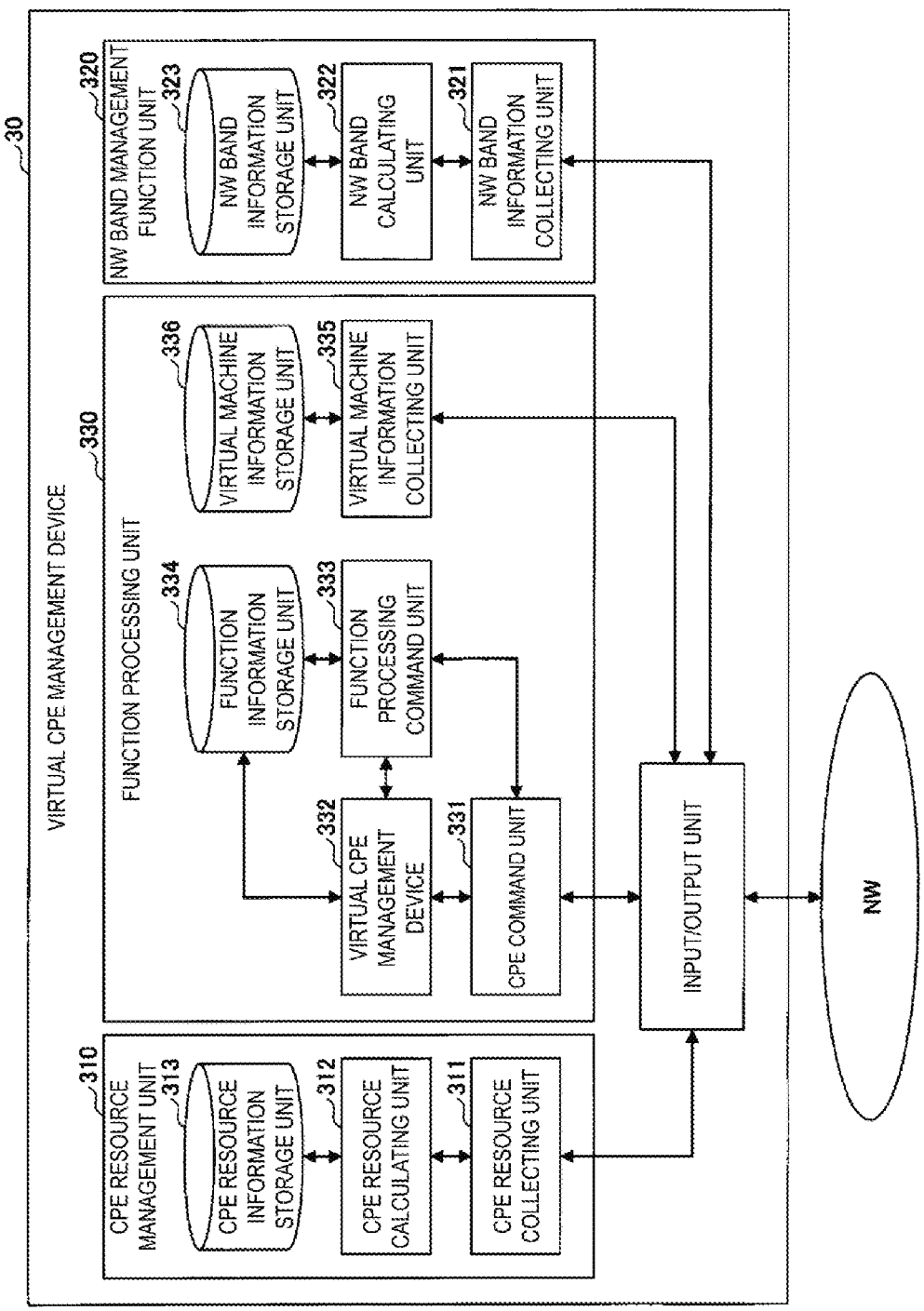
FIG. 7 is a functional configuration diagram of a virtual CPE management device according to an embodiment of the present invention.

FIG. 7 is a functional configuration diagram of the virtual CPE management device 30 according to an embodiment of the present invention. The virtual CPE management device 30 includes a CPE resource management unit 310, an NW band management function unit 320, and a function processing unit 330.

The CPE resource management unit 310 includes a CPE resource collecting unit 311 that collects resource information from the CPE 10, the CPE resource calculating unit 312 that checks whether there are sufficient free resources for executing a function with a high band occupancy ratio on the CPE 10, and a CPE resource information storage unit 313 that stores resource information collected from the CPE 10.

The NW band management function unit 320 includes an NW band information collecting unit 321 that collects NW band information from the virtual CPE server 20, the NW band calculating unit 322 that detects whether a total band used between the CPE 10 and the virtual CPE server 20 exceeds a threshold and detects a function with a high band occupancy ratio, and an NW band information storage unit 323 that stores information of NW bands collected from the virtual CPE server 20. As will be described below, if specific CPE 10 exhibits a high band occupancy ratio and the virtual CPE management device 30 gives the specific CPE 10 an instruction of function deployment, the NW band calculating unit 322 detects a combination of CPE with a high band occupancy ratio and a function.

The function processing unit 330 includes a CPE command unit 331 that gives the CPE 10 an instruction of function deployment, a virtual machine activation command unit 332 that activates a virtual machine on the CPE 10, a function processing command unit 333 that causes a function to be executed on the virtual machine of the CPE 10, and a function information storage unit 334 that stores setting information of the function to be executed on the virtual machine of the CPE 10. In addition, the function processing unit 330 includes a virtual machine information collecting unit 335 that collects information of a virtual machine such as an operation state of a function executed on the virtual machine of the CPE 10 and an amount of traffic to be processed, and a virtual machine information storage unit 336 that stores the collected information of the virtual machine.

Figure 8:
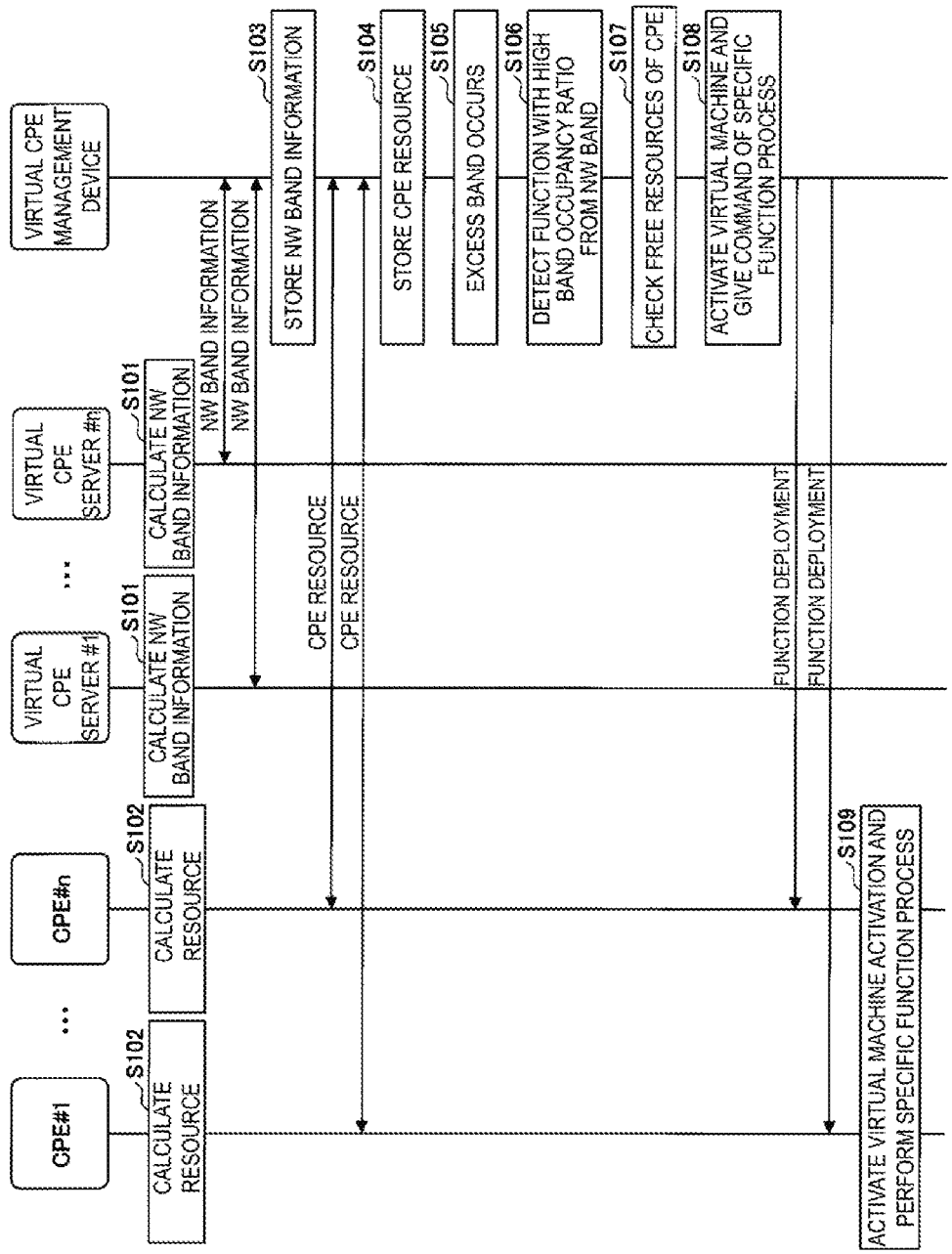
FIG. 8 is a flowchart (part 1) of a function management method of the communication system according to an embodiment of the present invention.

FIG. 8 is a flowchart (part 1) of a function management method of the communication system according to an embodiment of the present invention.

In step S101, the NW band information collecting unit 221 of the virtual CPE server 20 collects a network usage status between the CPE 10 and the virtual CPE server 20 and stores the network usage status in the NW band information storage unit 223. The NW band information calculating unit 222 calculates a band occupancy ratio by function.

In step S102, the system resource collecting unit 111 of the CPE 10 collects resource statuses inside the CPE 10 and stores the resource statuses in the resource information storage unit 113. The system resource calculating unit 112 calculates free resources.

In step S103, the NW band information collecting unit 321 of the virtual CPE management device 30 collects NW band information from the virtual CPE server 20 via the input/output unit and stores the NW band information in the NW band information storage unit 323. Note that, the NW band information collecting unit 321 may collect the NW band information by making a request to the virtual CPE server 20 or may collect the NW band information transmitted autonomously (e.g., periodically) by the virtual CPE server 20.

In step S104, the CPE resource collecting unit 311 of the virtual CPE management device 30 collects resource information from the CPE 10 via the input/output unit and stores the resource information in the CPE resource information storage unit 313. Note that the CPE resource collecting unit 311 may collect resource information by making a request to the CPE 10, or may collect resource information transmitted autonomously (e.g., periodically) by the CPE 10.

Note that steps S101 and S102 may be performed in any order, and steps S103 and S104 may be performed in any order as well.

In step S105, the NW band calculating unit 322 of the virtual CPE management device 30 detects that a total band used between the CPE 10 and the virtual CPE server 20 exceeds a threshold.

In step S106, the NW band calculating unit 322 of the virtual CPE management device 30 detects a function with a high band occupancy ratio from the NW band information stored in the NW band information storage unit 323.

In step S107, the CPE resource calculating unit 312 of the virtual CPE management device 30 checks that there are sufficient free resources for executing the function with a high band occupancy ratio on the CPE 10.

In step S108, the CPE command unit 331 of the virtual CPE management device 30 determines to deploy a function from the virtual CPE server 20 to the CPE 10, and the virtual machine activation command unit 332 activates a virtual machine on the CPE 10 via the CPE command unit 331 and the input/output unit. For example, the CPE 10 is assumed to have an environment for performing virtualization techniques and the virtual machine is activated on the CPE 10 due to a command from the virtual machine activation command unit 332. Furthermore, the function processing command unit 333 causes the function to be executed on the virtual machine of the CPE 10 using the setting information stored in the function information storage unit 334 via the CPE command unit 331 and the input/output unit. For example, the CPE 10 is assumed to have a functional application for providing the function on the virtual machine, and the function is assumed to be executed on the CPE 10 due to a command from the function processing command unit 333. If there is no functional application in the CPE 10, it is also possible to transmit a functional application from the function processing command unit 333.

In step S109, the CPE command receiving unit 121 receives, via the input/output unit, an instruction of function deployment from the virtual CPE management device 30, and the virtual machine activation executing unit 122 activates the virtual machine on the CPE 10. Furthermore, the function processing executing unit 123 executes the function instructed by the virtual CPE management device 30 on the virtual machine.

Figure 9:
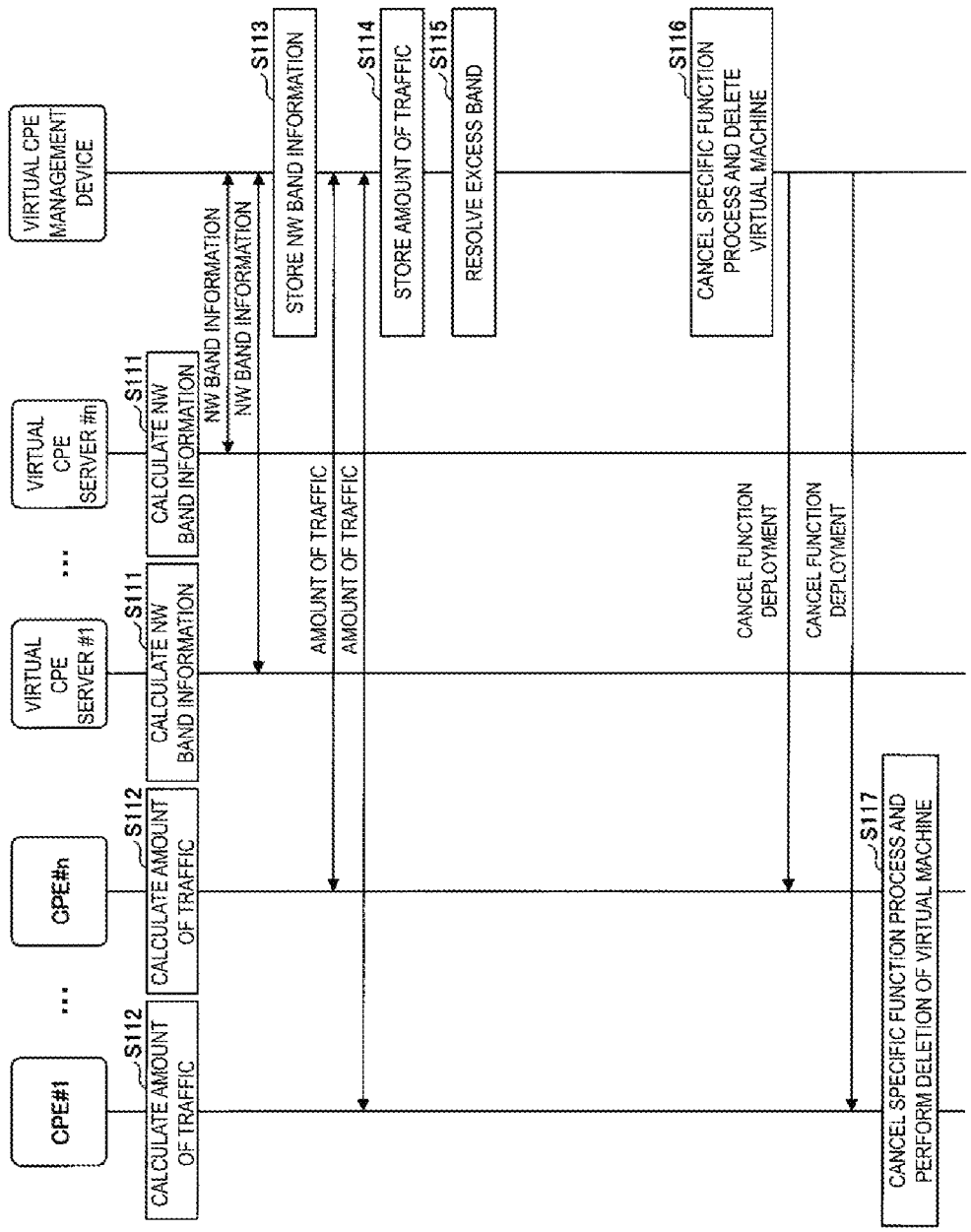
FIG. 9 is a flowchart (part 2) of the function management method of the communication system according to the embodiment of the present invention.

FIG. 9 is a flowchart (part 2) of the function management method of the communication system according to the embodiment of the present invention. FIG. 9 is performed after the function with a high band occupancy ratio is deployed from the virtual CPE server 20 to the CPE 10.

In step S111, the NW band information collecting unit 221 of the virtual CPE server 20 collects a network usage status between the CPE 10 and the virtual CPE server 20 and stores the network usage status in the NW band information storage unit 223. The NW band information calculating unit 222 calculates a band occupancy ratio by function. Here, after the function is deployed from the virtual CPE server 20 to the CPE 10, the band occupancy ratio of the function decreases and may be 0% when the function is deployed to all pieces of the CPE 10.

In step S112, the virtual machine information collecting unit 124 of the CPE 10 collects an amount of traffic to be processed by the function executed on the virtual machine of the CPE 10 and stores the amount of traffic in the virtual machine information storage unit 125.

In step S113, the NW band information collecting unit 321 of the virtual CPE management device 30 collects NW band information from the virtual CPE server 20 via the input/output unit and stores the NW band information in the NW band information storage unit 323. Note that, the NW band information collecting unit 321 may collect the NW band information by making a request to the virtual CPE server 20 or may collect the NW band information transmitted autonomously (e.g., periodically) by the virtual CPE server 20.

In step S114, the virtual machine information collecting unit 335 of the virtual CPE management device 30 collects, via the input/output unit, the amount of traffic of the function executed on the virtual machine from the CPE 10 and stores the amount of traffic in the virtual machine information storage unit 336. Note that the virtual machine information collecting unit 335 may collect virtual machine information by making a request to the CPE 10 or may collect virtual machine information transmitted autonomously (e.g., periodically) by the CPE 10.

Note that steps S111 and S112 may be performed in any order, and steps S113 and S114 may be performed in any order as well.

In step S115, the NW band calculating unit 322 of the virtual CPE management device 30 detects that the total band used between the CPE 10 and the virtual CPE server 20 does not exceed the threshold even if the function being executed on the virtual machine of the CPE 10 is caused to be executed in the virtual CPE server 20. In particular, if the value obtained by adding the amount of traffic of the function executed on the virtual machine of the CPE 10 to the total band used between the CPE 10 and the virtual CPE server 20 is less than or equal to a threshold, the function being executed on the virtual machine of the CPE 10 can be caused to be executed in the virtual CPE server 20.

In step S116, the CPE command unit 331 of the virtual CPE management device 30 determines to deploy the function from the CPE 10 to the virtual CPE server 20, and the function processing command unit 333 cancels the execution of the function on the virtual machine of the CPE 10 via the CPE command unit 331 and the input/output unit. In addition, the virtual machine activation command unit 332 cancels the activation of the virtual machine via the CPE command unit 331 and the input/output unit.

In step S117, the CPE command receiving unit 121 receives, via the input/output unit, the cancellation of the function deployment from the virtual CPE management device 30, and the function processing executing unit 123 cancels the execution of the function instructed by the virtual CPE management device 30. Furthermore, the virtual machine activation executing unit 122 cancels the activation of the virtual machine.

Note that, although FIG. 8 and FIG. 9 show an example of giving an instruction of function deployment to all pieces of the CPE, it is also possible to give an instruction of function deployment to specific CPE.

First Embodiment

Referring to FIG. 10 to FIG. 13, an example in which the virtual CPE management device 30 controls packets flowing into a network by giving an instruction of function deployment to all pieces of CPE 10 #1 to #n will be described. Steps S103 to S109 and S114 to S117 of FIG. 10 to FIG. 13 correspond to steps S103 to S109 and S114 to S117 of FIG. 8 and FIG. 9, respectively.

First, a process performed in a case in which mass transmission to a function B occurs due to virus infection or the like will be described.

Figure 10:
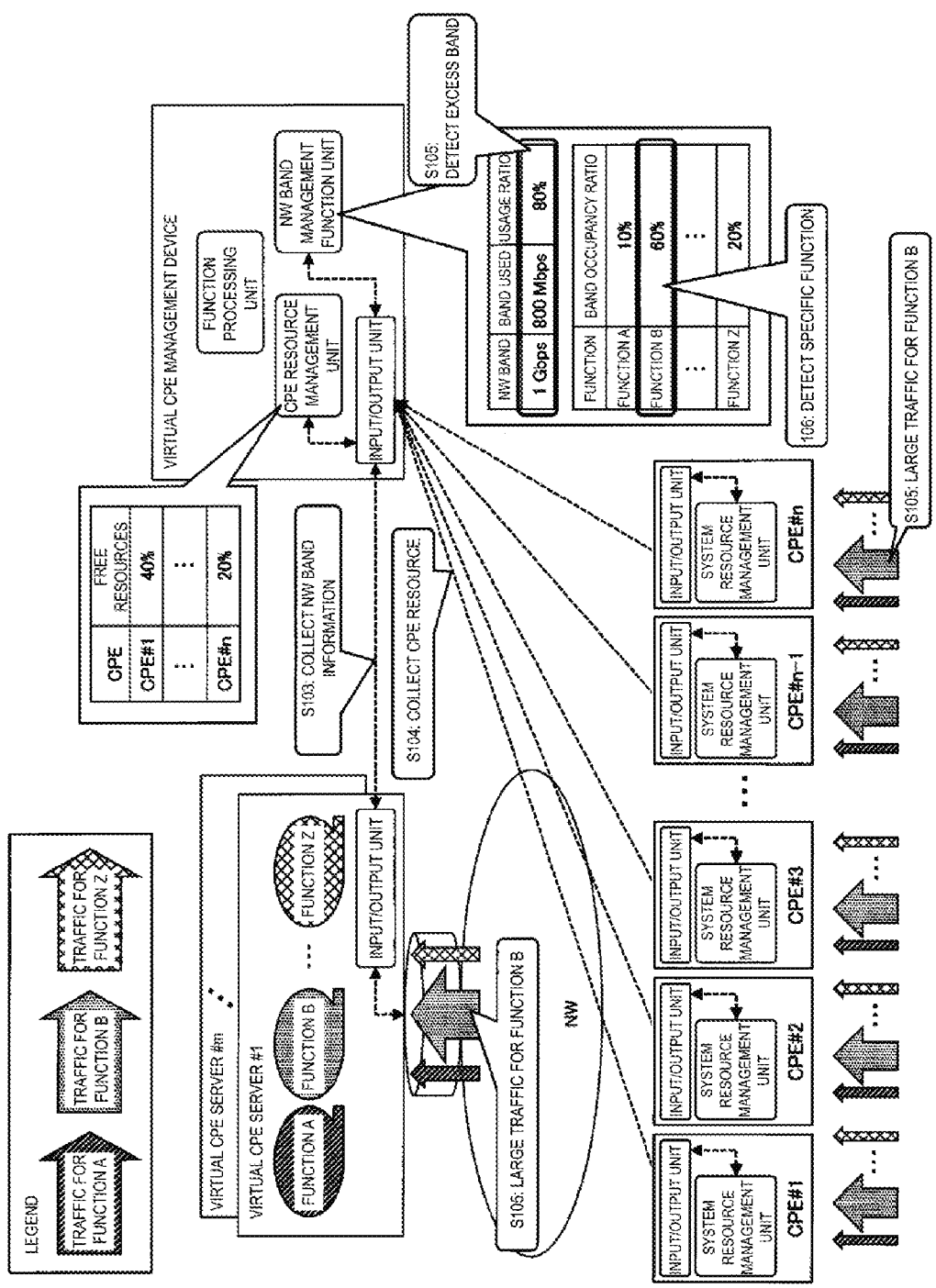
FIG. 10 is a diagram showing NW band management and CPE resource management in a first embodiment of the present invention.

Prior to steps S103 and S104 of FIG. 10, the NW band information collecting unit 221 of each of virtual CPE servers 20 #1 to #m collects a network usage status between the CPE 10 #1 to #n and the virtual CPE servers 20 #1 to #m, and the system resource collecting unit 111 of each of the CPE 10 #1 to #n collects a resource status in each of the CPE 10 #1 to #n.

In step S103, the NW band information collecting unit 321 of the virtual CPE management device 30 collects NW band information from the virtual CPE servers 20 #1 to #m. From the collected NW band information, the NW band calculating unit 322 can calculate the band being used between the CPE 10 #1 to #n and the virtual CPE servers 20 #1 to #m among all NW bands of 1 Gbps and a use ratio of the band. In addition, the NW band calculating unit 322 can calculate a band occupancy ratio by function.

In step S104, the CPE resource collecting unit 311 of the virtual CPE management device 30 collects resource information from the CPE 10 #1 to #n. The CPE resource collecting unit 311 may collect information of free resources from the CPE 10 #1 to #n, or the CPE resource calculating unit 312 may calculate free resources.

In step S105, it is assumed that traffic for the function B flowing into the CPE 10 #1 to #n increases, thereby increasing traffic for the function B flowing into the virtual CPE servers 20 #1 to #m. The NW band calculating unit 322 of the virtual CPE management device 30 detects that 800 Mbps out of all NW bands of 1 Gbps is being used between the CPE 10 #1 to #n and the virtual CPE servers 20 #1 to #m and the use ratio of the band is 80%. Here, it is assumed that the bands of the network are likely to be under pressure when the use ratio of the band exceeds 70%. The NW band calculating unit 322 detects that the use ratio of the band exceeds a threshold 70%.

In step S106, the NW band calculating unit 322 of the virtual CPE management device 30 detects that the band occupancy ratio of the function B is 60% and the band occupancy ratio is high.

Figure 11:
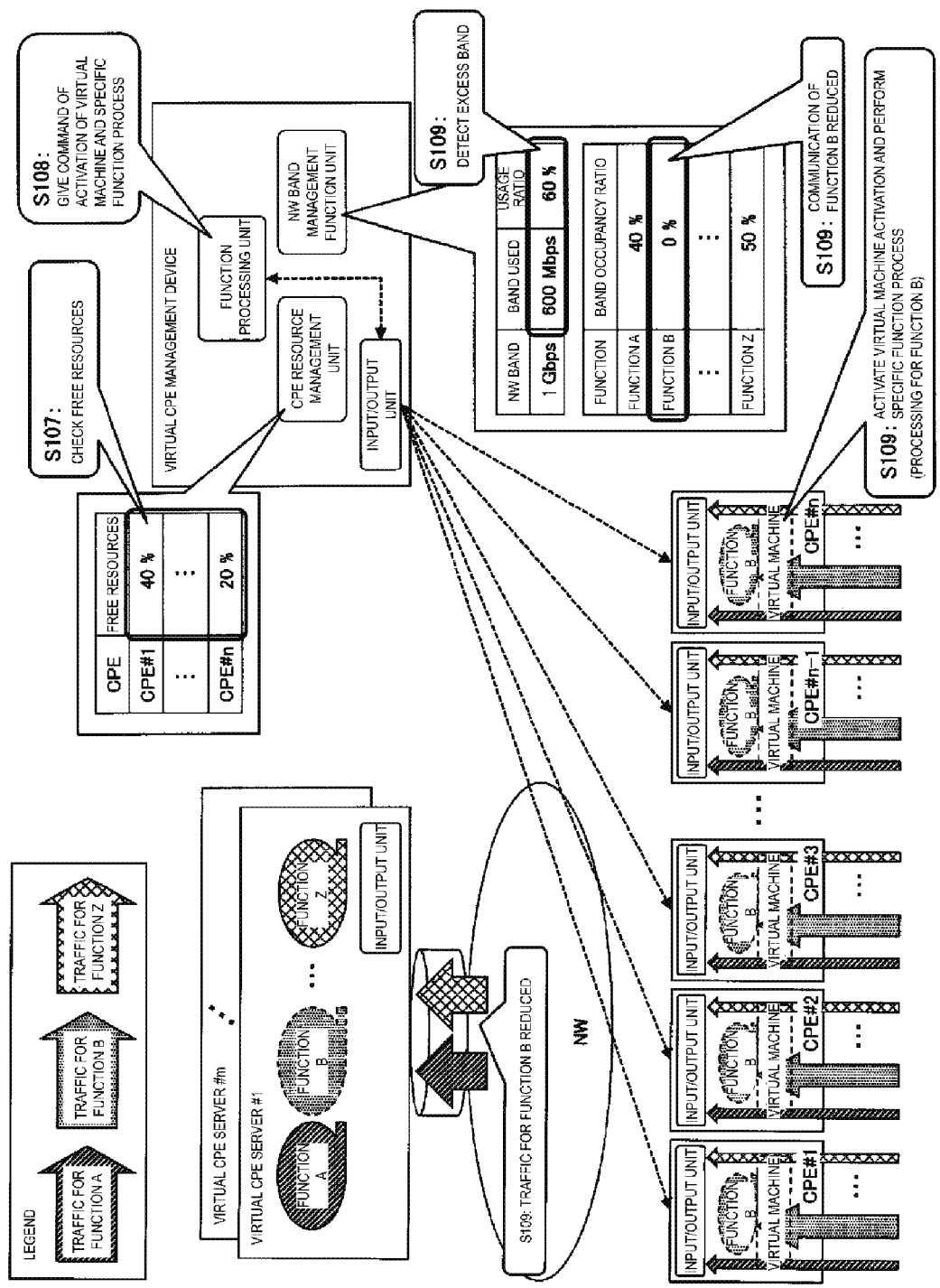
FIG. 11 is a diagram showing function deployment in CPE according to the first embodiment of the present invention.

In step S107 of FIG. 11, the CPE resource calculating unit 312 of the virtual CPE management device 30 checks free resources of the CPE 10 #1 to #n to confirm that there are sufficient free resources for executing the function B on the CPE 10 #1 to #n. Note that, if there are no sufficient free resources in some pieces of the CPE 10, for example, if there are no sufficient free resources in the CPE 10 #2, the subsequent processing is performed for all pieces of the CPE 10 #1 and #3 to #n except the CPE 10 #2.

In step S108, the CPE command unit 331 of the virtual CPE management device 30 determines to deploy the function B from the virtual CPE servers 20 #1 to #m to the CPE 10 #1 to #n, and the virtual machine activation command unit 332 activates a virtual machine on the CPE 10 #1 to #n. Further, the function processing command unit 333 causes the function B to be executed on the virtual machines of the CPE 10 #1 to #n.

In step S109, the virtual machine activation executing unit 122 of the CPE 10 activates the virtual machines on the CPE 10 #1 to #n. Furthermore, the function processing executing unit 123 executes the function B on the virtual machines. As a result, the traffic for the function B flowing into the virtual CPE servers 20 #1 to #m decreases. The NW band calculating unit 322 detects that 600 Mbps of all NW bands of 1 Gbps is being used between the CPE 10 #1 to #n and the virtual CPE servers 20 #1 to #m and the use ratio of the band is 60% and detects that the use ratio of the band is below the threshold 70%. In addition, it is detected that the band occupancy ratio of the function B is 0%. The execution of the function B in the virtual CPE servers 20 #1 to #m may be or may not be canceled.

Next, processing in a case in which virus infection or the like, which has caused mass transmission of the function B, is eliminated will be described.

Figure 12:
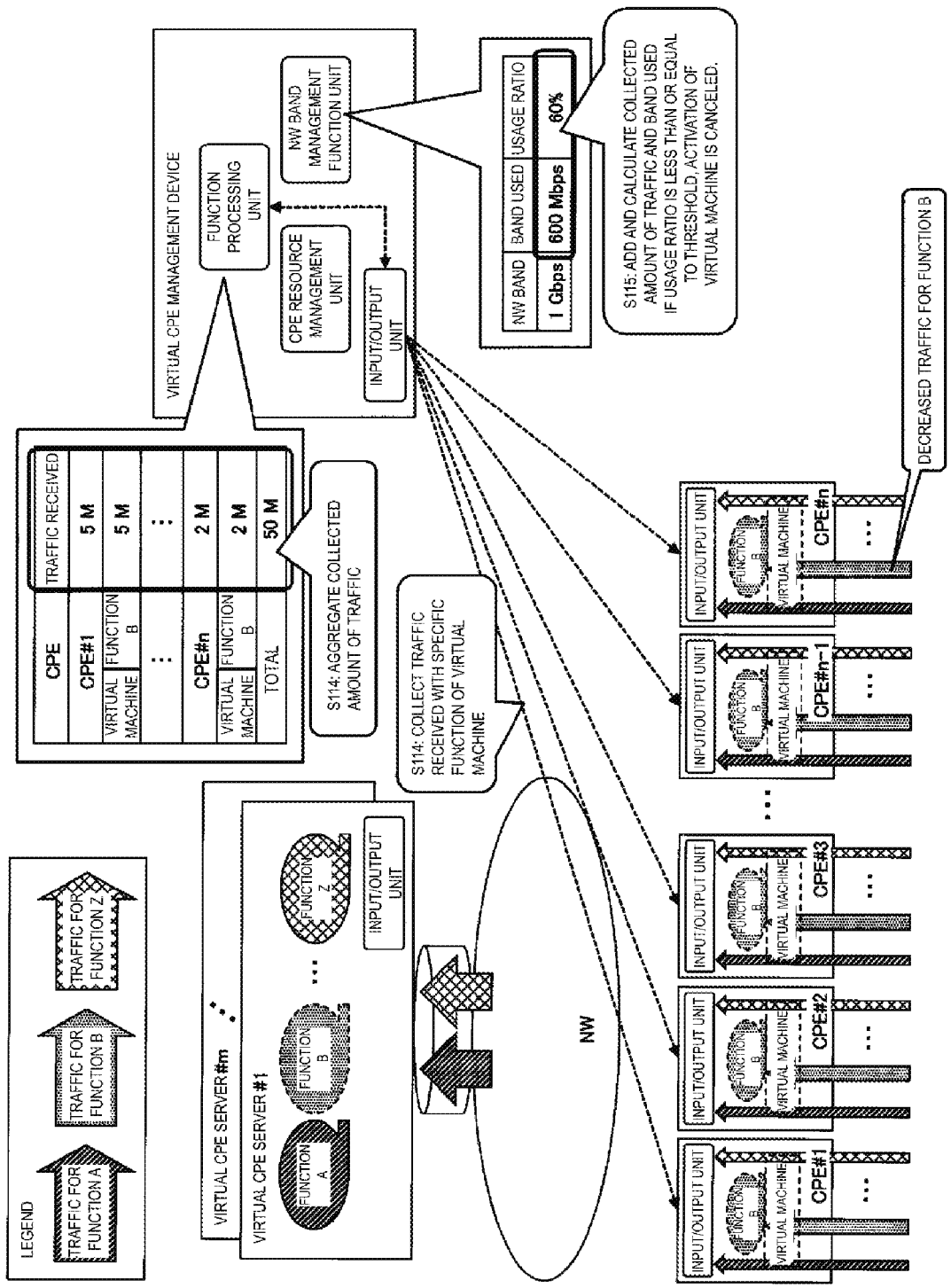
FIG. 12 is a diagram showing NW band management after the function deployment in the CPE according to the first embodiment of the present invention.

Prior to step S114 of FIG. 12, the NW band information collecting unit 221 of each of the virtual CPE servers 20 #1 to #m collects a network usage status between the CPE 10 #1 to #n and the virtual CPE servers 20 #1 to #m, and the NW band information collecting unit 321 of the virtual CPE management device 30 collects NW band information from the virtual CPE servers 20 #1 to #m. In addition, the virtual machine information collecting unit 124 of each of the CPE 10 #1 to #n collects an amount of traffic to be processed by the function B.

In step S114, the virtual machine information collecting unit 335 of the virtual CPE management device 30 collects amounts of traffic for the function B from the CPE 10 #1 to #n and aggregates the collected amounts of traffic. Here, it is assumed that the total amount of traffic for the function B executed on the virtual machines of the CPE 10 #1 to #n is 50 Mbps.

In step S115, the NW band calculating unit 322 of the virtual CPE management device 30 detects that, even if the amount of traffic 50 Mbps of the function B executed on the virtual machines of the CPE 10 #1 to #n is added to the total band used 600. Mbps between the CPE 10 #1 to #n and the virtual CPE servers 20 #1 to #m, the addition result is below the threshold 70%.

Figure 13:
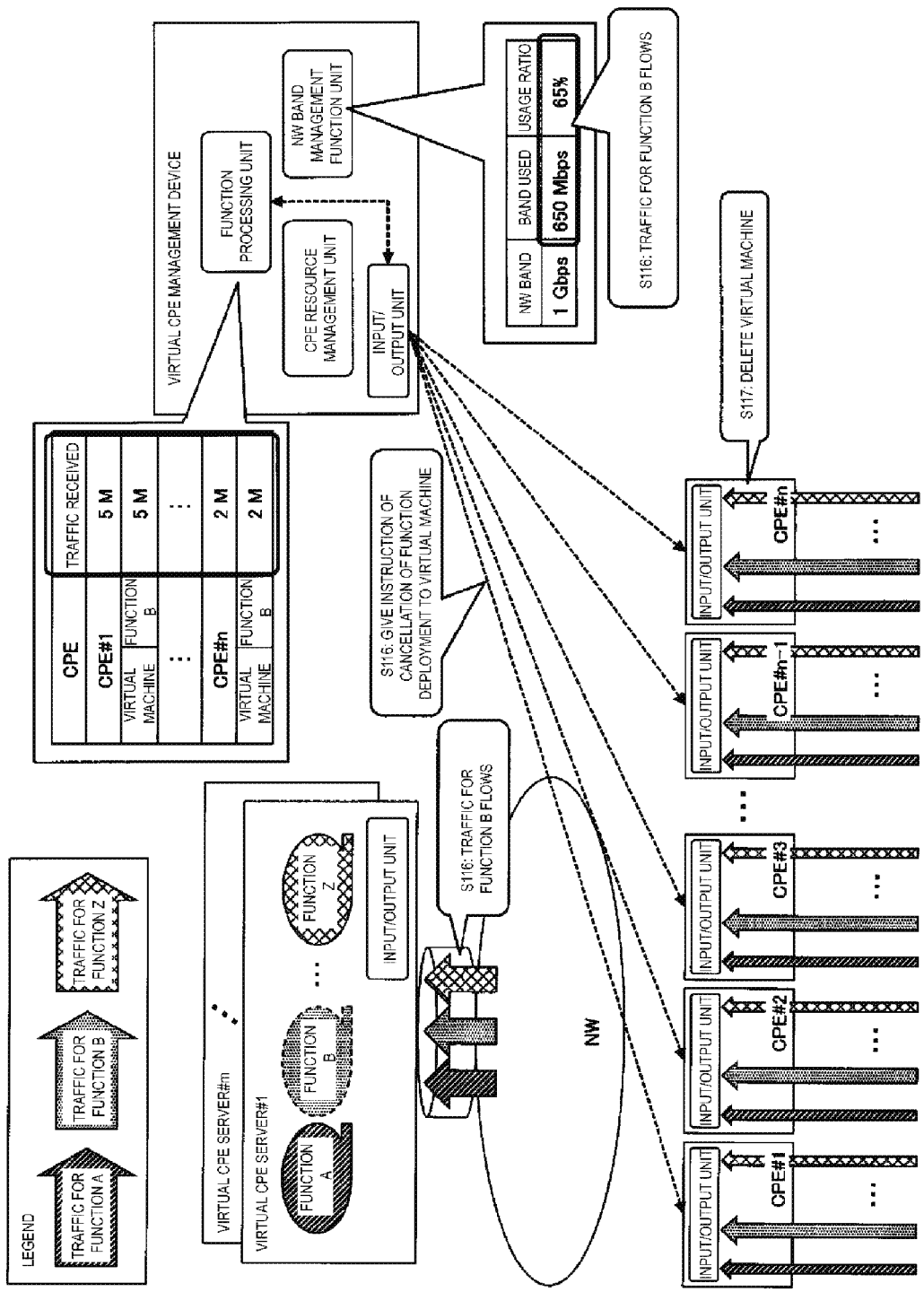
FIG. 13 is a diagram showing cancellation of the function deployment in the CPE in the first embodiment of the present invention.

In step S116 of FIG. 13, the function processing command unit 333 of the virtual CPE management device 30 cancels the execution of the function B on the virtual machines of the CPE 10 #1 to #n, and in step S117, the function processing executing unit 123 of each of the CPE 10 #1 to n cancels the execution of the function B instructed by the virtual CPE management device 30. As a result, it is detected that traffic for the function B flows from the CPE 10 #1 to #n to the virtual CPE servers 20 #1 to #m, the total band used between the CPE 10 #1 to #n and the virtual CPE servers 20 #1 to #m is 650 Mbps, and the use ratio of the band is 65%.

In addition, the virtual machine activation command unit 332 of the virtual CPE management device 30 cancels activation of the virtual machines, and in step S117, the virtual machine activation executing unit 122 of each of the CPE 10 #1 to #n cancels the activation of the virtual machines.

Second Embodiment

Referring to FIG. 14 to FIG. 17, an example in which the virtual CPE management device 30 controls packets flowing into a network from specific CPE 10 by giving an instruction of function deployment to the specific CPE 10 will be described. Steps S103 to S109 and S114 to S117 of FIG. 14 to FIG. 17 correspond to steps S103 to S109 and S114 to S117 of FIG. 8 and FIG. 9, respectively.

First, processing in a case in which simultaneous calls from specific CPE 10 to the function A of the virtual CPE server 20 occur due to a power failure, virus infection, or the like will be described.

Figure 14:
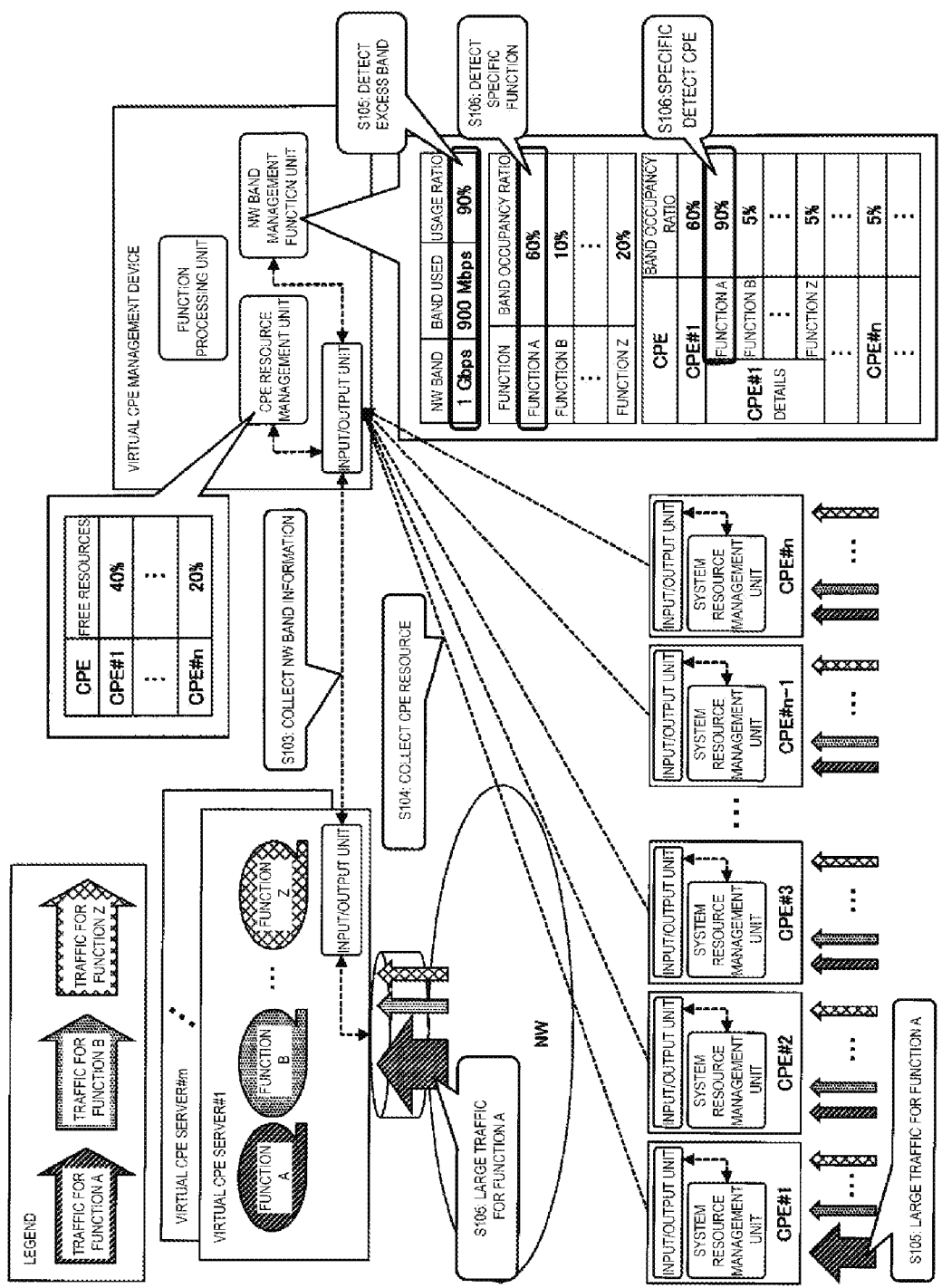
FIG. 14 is a diagram showing NW band management and CPE resource management in a second embodiment of the present invention.

Prior to steps S103 and S104 of FIG. 14, the NW band information collecting unit 221 of each of the virtual CPE servers 20 #1 to #m collects a network usage status between the CPE 10 #1 to #n and the virtual CPE servers 20 #1 to #m, and the system resource collecting unit 111 of each of the CPE 10 #1 to #n collects a resource status inside the CPE 10 #1 to #n.

In step S103, the NW band information collecting unit 321 of the virtual CPE management device 30 collects NW band information from the virtual CPE servers 20 #1 to #m. From the collected NW band information, the NW band calculating unit 322 can calculate the band being used between the CPE 10 #1 to #n and the virtual CPE servers 20 #1 to #m among all NW bands of 1 Gbps and a use ratio of the band. In addition, the NW band calculating unit 322 can calculate a band occupancy ratio by CPE and by function.

In step S104, the CPE resource collecting unit 311 of the virtual CPE management device 30 collects resource information from the CPE 10 #1 to #n. The CPE resource collecting unit 311 may collect information of free resources from the CPE 10 #1 to #n, or the CPE resource calculating unit 312 may calculate free resources.

In step S105, it is assumed that traffic for the function A flowing into the CPE 10 #1 increases, thereby increasing traffic for the function A flowing into virtual CPE servers 20 #1 to #m. The NW band calculating unit 322 of the virtual CPE management device 30 detects that 900 Mbps out of all NW bands of 1 Gbps is being used between the CPE 10 #1 to #n and the virtual CPE servers 20 #1 to #m and the use ratio of the band is 90%. Here, it is assumed that the bands of the network are likely to be under pressure when the use ratio of the band exceeds 70%. The NW band calculating unit 322 detects that the use ratio of the band exceeds the threshold 70%.

In step S106, the NW band calculating unit 322 of the virtual CPE management device 30 detects that the band occupancy ratio of the function A is 60% and the band occupancy ratio is high. In addition, the NW band calculating unit 322 detects that the band occupancy ratio of the CPE 10 #1 is 60%, and the function A occupies 90% of the percentage, so the band occupancy ratio of the function A of the CPE 10 #1 is high.

Figure 15:
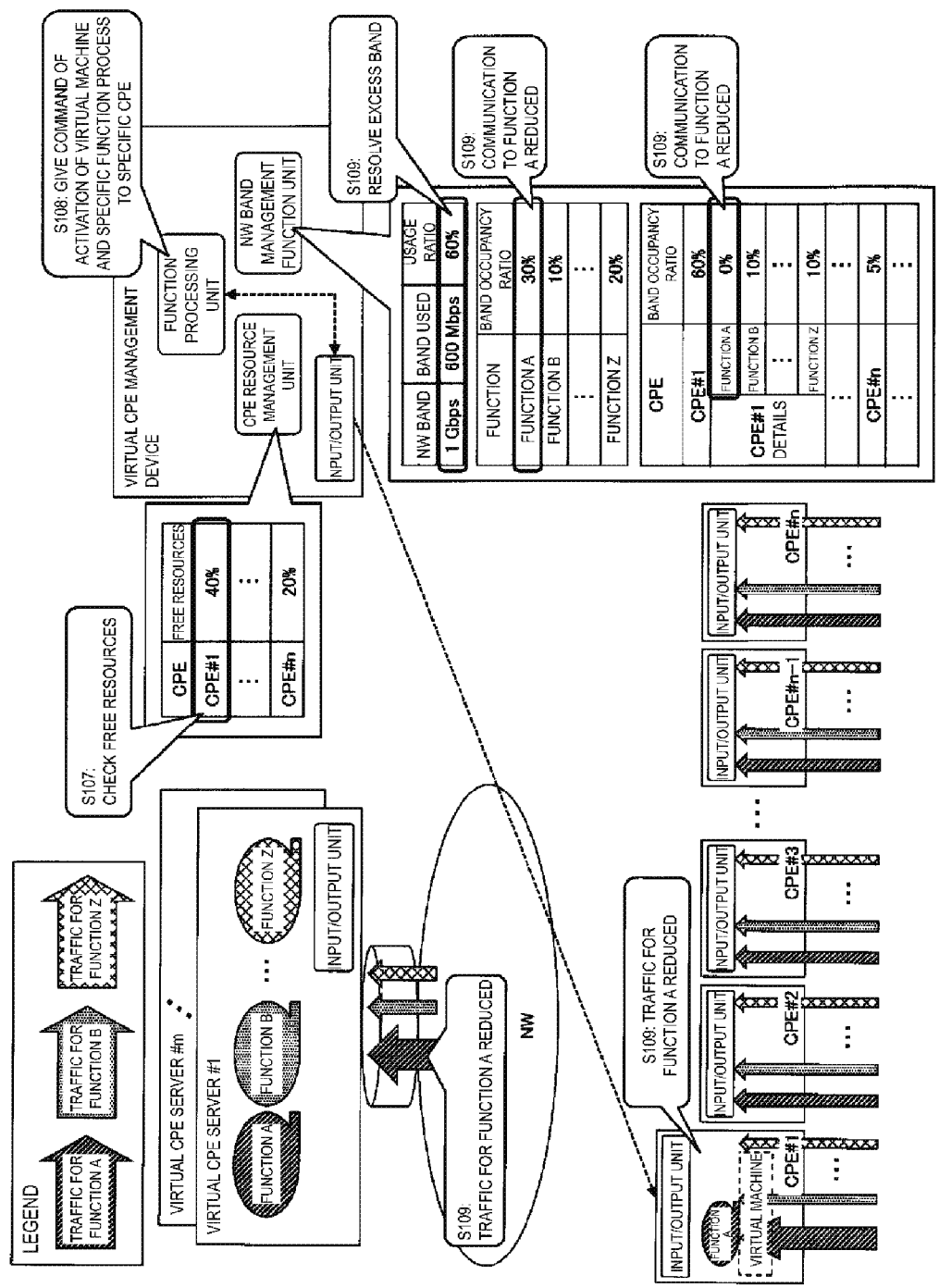
FIG. 15 is a diagram showing function deployment in CPE according to the second embodiment of the present invention.

In step S107 of FIG. 15, the CPE resource calculating unit 312 of the virtual CPE management device 30 checks free resources of the CPE 10 #1 to confirm that there are sufficient free resources for executing the function A on the CPE 10 #1.

In step S108, the CPE command unit 331 of the virtual CPE management device 30 determines to deploy the function A to the CPE 10 #1, and the virtual machine activation command unit 332 activates a virtual machine on the CPE 10 #1. Further, the function processing command unit 333 causes the function A to be executed on the virtual machine of the CPE 10 #1.

In step S109, the virtual machine activation executing unit 122 of the CPE 10 activates the virtual machine on the CPE 10 #1. Furthermore, the function processing executing unit 123 executes the function A on the virtual machine. As a result, the traffic for the function A flowing into the virtual CPE servers 20 #1 to #m decreases. The NW band calculating unit 322 detects that 600 Mbps of all NW bands of 1 Gbps is being used between the CPE 10 #1 to #n and the virtual CPE servers 20 #1 to #m and the use ratio of the band is 60% and detects that the use ratio of the band is below the threshold 70%. In addition, it is detected that the band occupancy ratio of the function A is 30%. Note that, because the processing of the function A on the CPE #1 is not performed in the virtual CPE servers 20 #1 to #m, the band occupancy ratio of the function A on the CPE 10 #1 is 0%.

Next, processing in a case in which a power failure, virus infection, or the like, which has caused simultaneous calls from specific CPE 10 to the function A of the virtual CPE server 20, is eliminated will be described.

Figure 16:
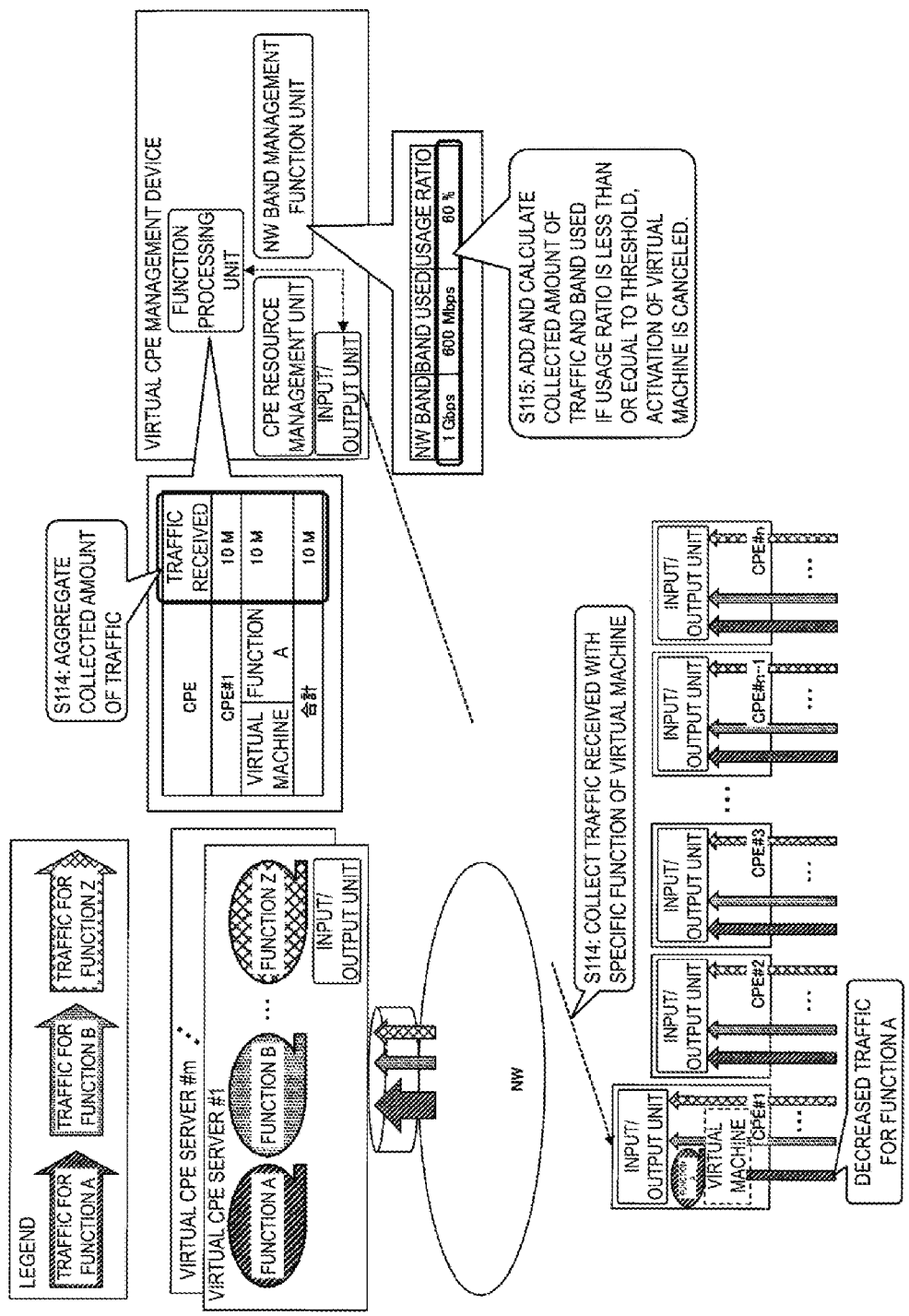
FIG. 16 is a diagram showing NW band management after the function deployment in the CPE according to the second embodiment of the present invention.

Prior to step S114 of FIG. 16, the NW band information collecting unit 221 of each of the virtual CPE servers 20 #1 to #m collects a network usage status between the CPE 10 #1 to #n and the virtual CPE servers 20 #1 to #m, and the NW band information collecting unit 321 of the virtual CPE management device 30 collects NW band information from the virtual CPE servers 20 #1 to #m. In addition, the virtual machine information collecting unit 124 of the CPE 10 #1 collects an amount of traffic to be processed by the function A.

In step S114, the virtual machine information collecting unit 335 of the virtual CPE management device 30 collects the amount of traffic of the function A from the CPE 10 #1 and aggregates the collected amount of traffic. Here, it is assumed that the total amount of traffic for the function A executed on the virtual machine of the CPE 10 #1 is 10 Mbps.

In step S115, the NW band calculating unit 322 of the virtual CPE management device 30 detects that, even if the amount of traffic 10 Mbps of the function A executed on the virtual machines of the CPE 10 #1 is added to the total band used 600. Mbps between the CPE 10 #1 to #n and the virtual CPE servers 20 #1 to #m, the addition result is below the threshold 70%.

Figure 17:
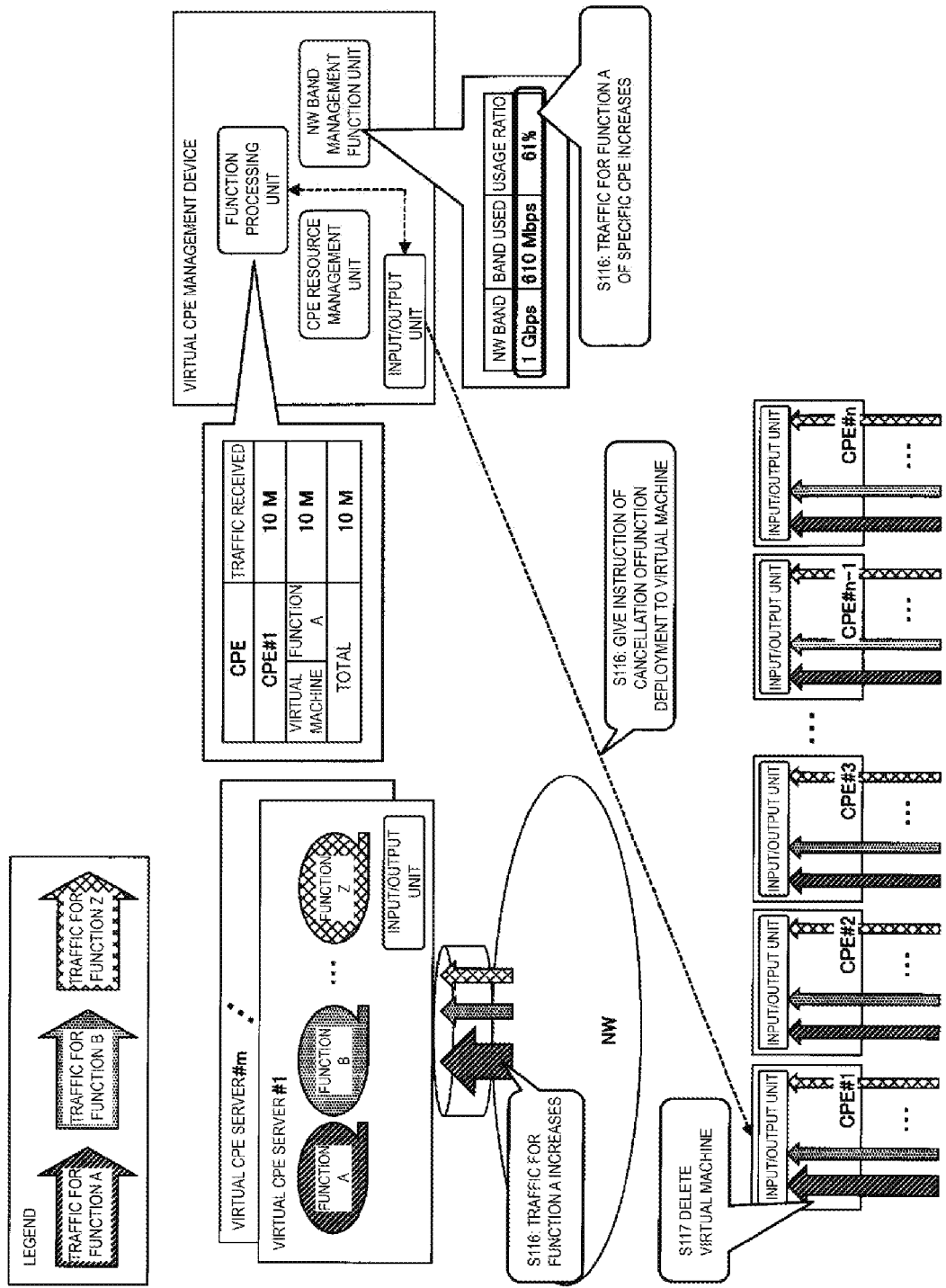
FIG. 17 is a diagram showing cancellation of the function deployment in the CPE in the second embodiment of the present invention.

In step S116 of FIG. 17, the function processing command unit 333 of the virtual CPE management device 30 cancels the execution of the function A on the virtual machine of the CPE 10 #1, and in step S117, the function processing executing unit 123 of the CPE 10 #1 cancels the execution of the function A instructed by the virtual CPE management device 30. As a result, it is detected that traffic for the function A flows from the CPE 10 #1 to the virtual CPE servers 20 #1 to #m, the total band used between the CPE 10 #1 to #n and the virtual CPE servers 20 #1 to #m is 610 Mbps, and the use ratio of the band is 61%.

Furthermore, the virtual machine activation command unit 332 of the virtual CPE management device 30 cancels the activation of the virtual machine, and in step S117, the virtual machine activation executing unit 122 of the CPE 10 #1 cancels the activation of the virtual machine.

Specific Example

Figure 18:
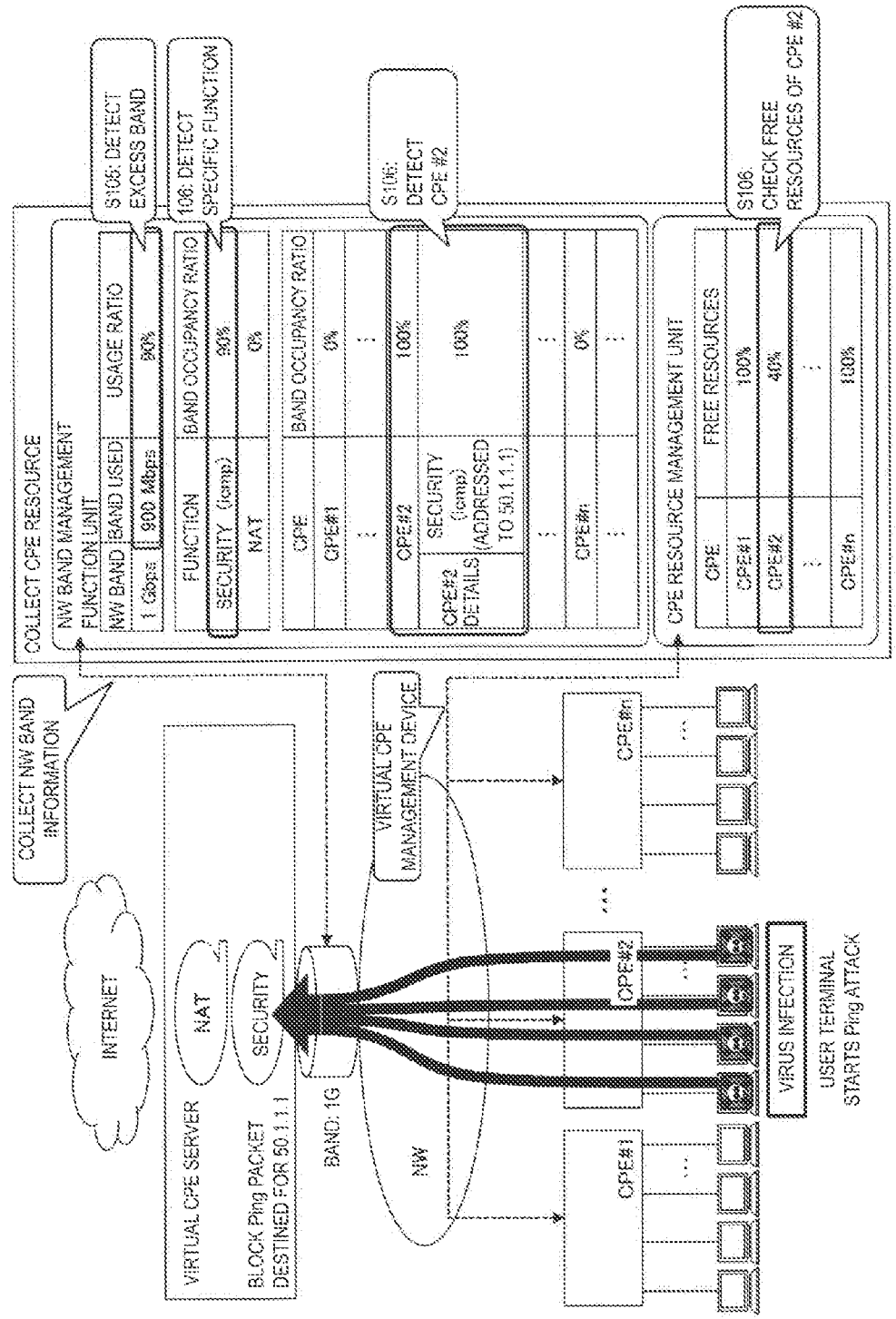
FIG. 18 is a diagram (part 1) showing a specific example of the second embodiment of the present invention.
Figure 19:
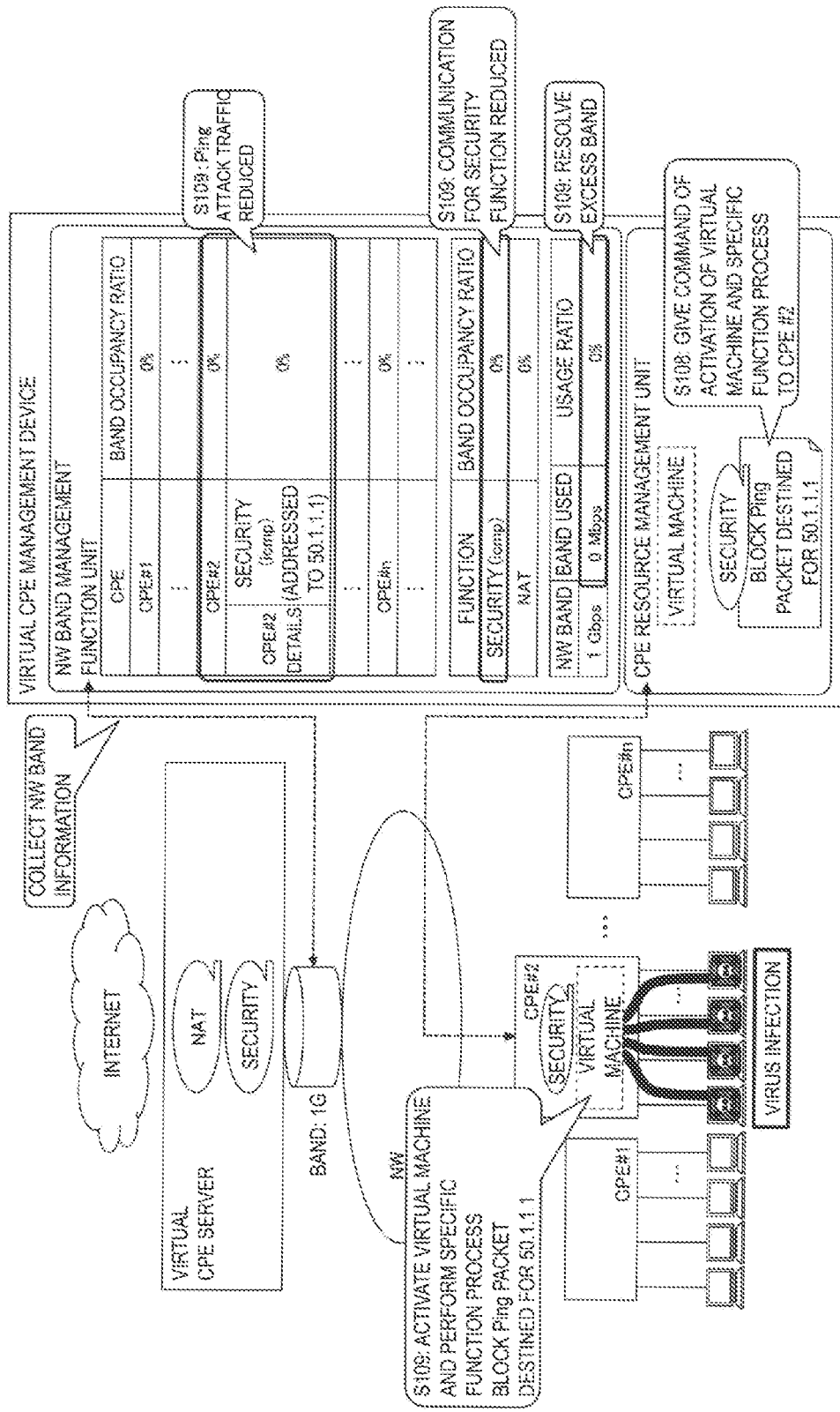
FIG. 19 is a diagram (part 2) showing the specific example of the second embodiment of the present invention.

Referring to FIG. 18 and FIG. 19, an example in which a user terminal contained in specific CPE #2 is infected with a virus and a simultaneous attack via Ping has occurred will be described as a specific example of the second embodiment. Steps S105 to S109 of each of FIG. 18 and FIG. 19 correspond to steps S105 to S109 of FIG. 8, respectively.

When a user terminal contained in specific CPE #2 is infected with a virus and a Ping attack on 50.1.1.1, starts, virtual CPE #2 transmits packets to the virtual CPE server 20 as usual. The virtual CPE server 20 blocks the packets destined for 50.1.1.1 using its security function.

In step S105, the NW band calculating unit 322 of the virtual CPE management device 30 detects that 900 Mbps of an entire NW band of 1 Gbps is being used between the CPE 10 #1 to #n and the virtual CPE server 20 due to the Ping attack on 50.1.1.1, and that the use ratio 90% of the band exceeds the threshold 70%.

In step S106, the NW band calculating unit 322 of the virtual CPE management device 30 detects that the band occupancy ratio of the security function is 90% so the band occupancy ratio is high. In addition, the NW band calculating unit 322 detects that the band occupancy ratio of the CPE 10 #2 is 100%, and the security function occupies 100% of the percentage, so the band occupancy ratio of the security function of the CPE 10 #2 is high.

In step S107, the CPE resource calculating unit 312 of the virtual CPE management device 30 checks free resources of the CPE 10 #2 to confirm that there are sufficient free resources for executing the security function on the CPE 10 #2.

In step S108 of FIG. 19, the CPE command unit 331 of the virtual CPE management device 30 determines to deploy the security function to the CPE 10 #2, and the virtual machine activation command unit 332 activates a virtual machine on the CPE 10 #2. Further, the function processing command unit 333 causes the security function to be executed on the virtual machine of the CPE 10 #2. At this time, parameters such as the destination address (50.1.1.1) and the protocol type (Ping) are also notified to the CPE 10 #2.

In step S109, the virtual machine activation executing unit 122 of the CPE 10 #2 activates the virtual machine on the CPE 10 #2. In addition, the function processing executing unit 123 performs the security function on the virtual machine to block the Ping packets destined for 50.1.1.1. As a result, Ping attack traffic flowing into the virtual CPE server 20 decreases to 0% and the band occupancy ratio of the security function decreases to 0%. The NW band calculating unit 322 detects that 0 Mbps of the entire NW band of 1 Gbps is being used between the CPE 10 #1 to #n and the virtual CPE servers 20 and the use ratio of the band is 0%, and detects that the use ratio of the band is below the threshold 70%.

Thus, pressure on the network band can be eliminated by deploying the security function to the CPE 10 #2.

Effects of Embodiment of Present Invention

According to an embodiment of the present invention, in the virtual CPE configuration, a situation in which a network band between the CPE and the virtual CPE server is under pressure due to mass transmission caused by virus infection of a user terminal or simultaneous calls caused by a power failure, or the like can be reduced or avoided. As a result, the effects on other normal communication can be reduced. In this manner, resources of the CPE can be efficiently used because functions are deployed in the CPE only at abnormal times, such as that of mass transmission and simultaneous calling. In addition, functions can be aggregated to the virtual CPE server in normal times.

Hardware Configuration Example

Figure 20:
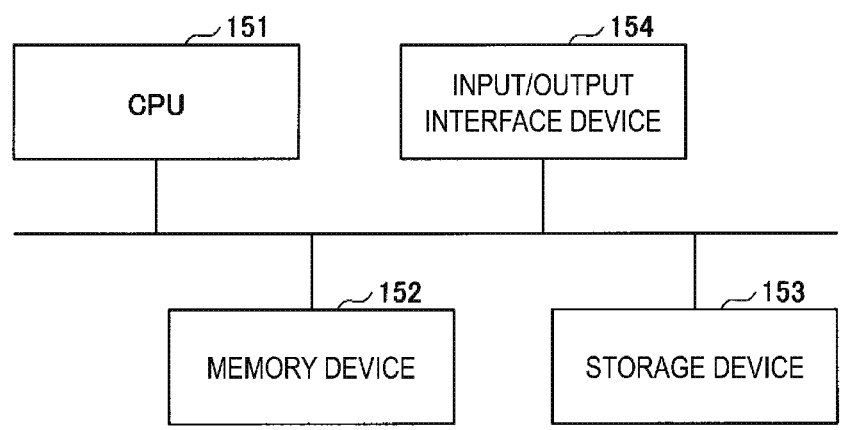
FIG. 20 is a diagram showing a hardware configuration example of each device according to an embodiment of the present invention.

FIG. 20 shows a hardware configuration example of each device (the CPE 10, the virtual CPE server 20, or the virtual CPE management device 30) according to an embodiment of the present invention. Each device may be a computer configured using a processor such as a central processing unit (CPU) 151, a memory device 152 such as a random access memory (RAM) and a read only memory (ROM), a storage device 153 such as a hard disk, and the like. For example, functions and processing of each device are achieved by the CPU 151 executing data and programs stored in the storage device 153 or the memory device 152. In addition, input of data to each device may be performed from an input/output interface device 154, and output of the data from each device may be performed from the input/output interface device 154.

Supplement

Although each device according to an embodiment of the present invention is described using functional block diagrams for convenience in explanation, each device according to an embodiment of the present invention may be realized in hardware, software, or a combination thereof. For example, an embodiment of the present invention may be realized by a program that enables a computer to perform the functions of each of the devices according to the examples of the present invention, a program that causes the computer to perform the steps of the method according to the examples of the present invention. Furthermore, each of the functional units may be used in combination as necessary. In addition, a method according to an embodiment of the present invention may also be performed in a different order from that shown in the embodiments.

Although a technique for reducing or avoiding pressure on a network band between CPE and a virtual CPE server caused by mass transmission, simultaneous calls, or the like from user terminals in a virtual CPE configuration has been described, the present invention is not limited to the above-described embodiments, and various modifications and applications are possible within the scope of the claims.

REFERENCE SIGNS LIST

10 CPE
110 System resource management unit
111 System resource collecting unit
112 System resource calculating unit
113 Resource information storage unit
120 Virtual machine activation function unit
121 CPE command receiving unit
122 Virtual machine activation executing unit
123 Function processing executing unit
124 Virtual machine information collecting unit
125 Virtual machine information storage unit
20 Virtual CPE server
210 Virtual CPE function unit
211 Virtual CPE transmitting/receiving unit
212 Virtual CPE operating unit
213 Function processing executing unit
220 NW band management unit
221 NW band information collecting unit
222 NW band information calculating unit 223 NW band information storage unit
30 Virtual CPE management device
310 CPE resource management unit
311 CPE resource collecting unit
312 CPE resource calculating unit
313 CPE resource information storage unit
320 NW band management function unit
321 NW band information collecting unit
322 NW band calculating unit
323 NW band information storage unit
330 Function processing unit
331 CPE command unit
332 Virtual machine activation command unit
333 Function processing command unit
334 Function information storage unit
335 Virtual machine information collecting unit
336 Virtual machine information storage unit

The invention claimed is:

1. A function management device that manages, in a communication system including a plurality of pieces of customer premises communication equipment and a server, a plurality of functions provided by the server to the plurality of pieces of customer premises communication equipment, the function management device comprising:
 a resource management unit, including one or more processors, configured to collect resource information from the plurality of pieces of customer premises communication equipment;
 a network management unit, including one or more processors, configured to collect, from the server, network band usage information for each of the functions, the network band being used for communication between the plurality of pieces of customer premises communication equipment and the server; calculate, based on the network band usage information, a network band occupancy ratio for each of the functions; and select, from among the functions provided by the server, a first function that has a network band occupancy ratio exceeding a band occupancy threshold; and
 a function processing unit, including one or more processors, configured to activate a virtual machine on one of the plurality of pieces of customer premises communication equipment and send, to the customer premises communication equipment, an instruction to perform the first function that has the network band occupancy ratio exceeding the band occupancy threshold in response to a determination that there are sufficient free resources for performing the first function on the customer premises communication equipment.

2. The function management device according to claim 1, wherein
 the network management unit is configured to collect network band usage information by piece of customer premises communication equipment and by function, and
 the function processing unit is configured to:
   detect a combination of a piece of customer premises communication equipment and the first function in response to a determination that a total band used between the plurality of pieces of customer premises communication equipment and the server exceeds a threshold; and
   in response to a determination that there are sufficient free resources for performing the first function on the detected customer premises communication equipment, activate a virtual machine on the detected customer premises communication equipment and cause the first function to be executed.

3. The function management device according to claim 1, wherein
 after activating the virtual machine on one of the plurality of pieces of customer premises communication equipment to execute the first function, the function processing unit is configured to cancel activation of the virtual machine and execution of the first function in response to a determination that a value obtained by adding the total band used between the plurality of pieces of customer premises communication equipment and the server to an amount of traffic to be processed by the first function of the customer premises communication equipment is less than a threshold.

4. A function management method of a function management device that manages, in a communication system including a plurality of pieces of customer premises communication equipment and a server, a plurality of functions provided by the server to the plurality of pieces of customer premises communication equipment, the function management method comprising:
 collecting resource information from the plurality of pieces of customer premises communication equipment;
 collecting, from the server, network band usage information for each of the functions, the network band being used for communication between the plurality of pieces of customer premises communication equipment and the server;
 calculating, based on the network band usage information, a network band occupancy ratio for each of the functions;
 selecting, from among the functions provided by the server, a first function that has a network band occupancy ratio exceeding a band occupancy threshold; and
 activating a virtual machine on one of the plurality of pieces of customer premises communication equipment and sending, to the customer premises communication equipment, an instruction to perform the first function that has the network band occupancy ratio exceeding the band occupancy threshold in response to a determination that there are sufficient free resources for performing the first function on the customer premises communication equipment.

5. A communication system comprising:
 a plurality of pieces of customer premises communication equipment, wherein each of the plurality of pieces of customer premises communication equipment includes a resource management unit, including one or more processors, configured to manage resource information indicating a resource status inside the customer premises communication equipment;
 a server configured to provide a plurality of functions to the plurality of pieces of customer premises communication equipment, wherein the server includes a network band management unit, including one or more processors, configured to manage network band information for each of the functions, the network band information indicating a usage status of a network band that is used for communication between the plurality of pieces of customer premises communication equipment and the server; and
 a function management device configured to manage the functions provided by the server, wherein the function management device includes a resource management unit, including one or more processors, configured to collect the resource information from the plurality of pieces of customer premises communication equipment, a network management unit, including one or more processors, configured to collect, from the server, network band usage information for each of the functions, the network band being used for communication between the plurality of pieces of customer premises communication equipment and the server; calculate, based on the network band usage information, a network band occupancy ratio for each of the functions; and select, from among the functions provided by the server, a first function that has a network band occupancy ratio exceeding a band occupancy threshold, and a function processing unit, including one or more processors, configured to activate a virtual machine on one of the plurality of pieces of customer premises communication equipment and send, to the customer premises communication equipment, an instruction to perform the first function that has the network band occupancy ratio exceeding the band occupancy threshold in response to a determination that there are sufficient free resources for performing the first function on the customer premises communication equipment.

6. The function management method according to claim 4 further comprising:

determining whether a total band used between the plurality of pieces of customer premises communication equipment and the server exceeds a threshold; and determining whether there are sufficient free resources for performing the first function on each of the plurality of pieces of customer premises communication equipment, wherein activating the virtual machine on one of the plurality of pieces of customer premises communication equipment based on the resource information and the network band usage information to cause the first function to be executed comprises:

activating a virtual machine on one of the plurality of pieces of customer premises communication equipment based on the resource information and the network band usage information to cause the first function to be executed in response to (i) determining that the total band used between the plurality of pieces of customer premises communication equipment and the server exceeds the threshold, and (ii) determining that there are sufficient free resources for performing the first function on each of the plurality of pieces of customer premises communication equipment.

7. The function management method according to claim 6 further comprising:

after activating the virtual machine on one of the plurality of pieces of customer premises communication equipment to execute the first function:

obtaining a value by adding the total band used between the plurality of pieces of customer premises communication equipment and the server to an amount of traffic to be processed by the first function of the customer premises communication equipment;

determining whether the value is less than a threshold; and in response to determining that the value is less than the threshold, canceling activation of the virtual machine and execution of the first function.

8. The function management method according to claim 4 further comprising:

collecting network band usage information by piece of customer premises communication equipment and by function;

determining whether a total band used between the plurality of pieces of customer premises communication equipment and the server exceeds a threshold;

in response to determining that the total band used between the plurality of pieces of customer premises communication equipment and the server exceeds the threshold, detecting a combination of a piece of customer premises communication equipment and the first function; and determining whether there are sufficient free resources for performing the first function on the detected customer premises communication equipment, and wherein activating the virtual machine on one of the plurality of pieces of customer premises communication equipment based on the resource information and the network band usage information to cause the first function to be executed comprises:

in response to determining that there are sufficient free resources for performing the first function on the detected customer premises communication equipment, activating a virtual machine on the detected piece of customer premises communication equipment based on the resource information and the network band usage information to cause the first function to be executed.

9. The communication system according to claim 5, wherein the function processing unit of the function management device is configured to activate the virtual machine on each of the plurality of pieces of customer premises communication equipment to cause the first function to be executed in response to a determination that a total band used between the plurality of pieces of customer premises communication equipment and the server exceeds a threshold and a determination that there are sufficient free resources for performing the first function on each of the plurality of pieces of customer premises communication equipment.

10. The communication system according to claim 9, wherein after activating the virtual machine on one of the plurality of pieces of customer premises communication equipment to execute the first function, the function processing unit of the function management device is configured to cancel activation of the virtual machine and execution of the first function in response to a determination that a value obtained by adding the total band used between the plurality of pieces of customer premises communication equipment and the server to an amount of traffic to be processed by the first function of the customer premises communication equipment is less than a threshold.

11. The communication system according to claim 5, wherein the network management unit of the function management device is configured to collect network band usage information by piece of customer premises communication equipment and by function, and the function processing unit of the function management device is configured to: detect a combination of a piece of customer premises communication equipment and the first function in response to a determination that a total band used between the plurality of pieces of customer premises communication equipment and the server exceeds a threshold; and in response to a determination that there are sufficient free resources for performing the first function on the detected customer premises communication equipment, activate a virtual machine on the detected customer premises communication equipment and cause the first function to be executed.

* * * * *